(12) United States Patent
Guan et al.

(10) Patent No.: US 9,453,630 B2
(45) Date of Patent: Sep. 27, 2016

(54) HEAD LAMP FOR VEHICLE AND METHOD OF CONTROLLING THE SAME

(71) Applicant: SL Corporation, Daegu (KR)

(72) Inventors: Jeong Myong Guan, Gyeonsangbuk-Do (KR); Hansub Lee, Gyeonsangbuk-Do (KR); Se Young Bang, Gyeonsangbuk-Do (KR)

(73) Assignee: SL Corporation, Daegu (KR)

( * ) Notice: Subject to any disclaimer, the term of this patent is extended or adjusted under 35 U.S.C. 154(b) by 287 days.

(21) Appl. No.: 14/015,365

(22) Filed: Aug. 30, 2013

(65) Prior Publication Data

US 2014/0063834 A1 Mar. 6, 2014

(30) Foreign Application Priority Data

| Aug. 31, 2012 | (KR) | 10-2012-0096591 |
| Sep. 5, 2012 | (KR) | 10-2012-0098326 |
| Sep. 5, 2012 | (KR) | 10-2012-0098332 |
| Sep. 5, 2012 | (KR) | 10-2012-0098334 |

(51) Int. Cl.
*F21S 8/10* (2006.01)
*B60Q 1/00* (2006.01)
*B60Q 1/26* (2006.01)

(52) U.S. Cl.
CPC ......... *F21S 48/1742* (2013.01); *B60Q 1/0058* (2013.01); *B60Q 1/2692* (2013.01); *F21S 48/215* (2013.01); *F21S 48/218* (2013.01); *F21S 48/2237* (2013.01); *F21S 48/2268* (2013.01); *F21S 48/2287* (2013.01); *B60Q 2400/30* (2013.01)

(58) Field of Classification Search
CPC ............. B60Q 1/0058; B60Q 1/0047; B60Q 2400/30; B60Q 1/2692; F21S 48/1742; F21S 48/2237
USPC ........................................................ 362/545
See application file for complete search history.

(56) References Cited

U.S. PATENT DOCUMENTS

| 4,760,499 | A | 7/1988 | Il |
| 5,050,049 | A | 9/1991 | Shichijoh et al. |
| 6,454,446 | B1 | 9/2002 | Hanna |
| 2009/0231876 | A1* | 9/2009 | Nakamura ........... B60Q 1/1407 362/545 |
| 2012/0081902 | A1* | 4/2012 | Tessnow .............. B60Q 1/0058 362/283 |

FOREIGN PATENT DOCUMENTS

| CN | 2030559 U | 1/1989 |
| EP | 1 985-913 A1 | 10/2008 |
| EP | 1985913 A1 | 10/2008 |
| JP | 2005-243430 A | 9/2005 |

(Continued)

*Primary Examiner* — Karabi Guharay
(74) *Attorney, Agent, or Firm* — Mintz Levin Cohn Ferris Glovsky and Popeo, P.C.; Kongsik Kim; Colleen H. Witherell

(57) ABSTRACT

Disclosed are a head lamp for a vehicle and a method of controlling the same. The head lamp for a vehicle according to an exemplary embodiment of the present invention includes: a first lamp module; and a second lamp module disposed at a front side of the first lamp module, in which a mode of the second lamp module is set to one of a first mode in which a portion of the second lamp module is overlapped with the first lamp module on a light proceeding path, and a second mode in which the second lamp module is not overlapped with the first lamp module.

22 Claims, 33 Drawing Sheets

(56) References Cited

FOREIGN PATENT DOCUMENTS

| JP | 2007-080539 A | 3/2007 |
| JP | 4363387 B2 | 11/2009 |
| JP | 2010-050008 A | 3/2010 |
| JP | 2010-254472 A | 11/2010 |
| KR | 10-1999-0011201 A | 2/1999 |
| KR | 10-2012-0034049 A | 4/2012 |

* cited by examiner

HEAD LAMP FOR VEHICLE AND METHOD OF CONTROLLING THE SAME

CROSS-REFERENCE TO RELATED APPLICATION

This application claims priority from Korean Patent Application No. 10-2012-0096591 filed on, Aug. 31, 2012 in the Korean Intellectual Property Office, Korean Patent Application No. 10-2012-0098326 filed on, Sep. 5, 2012 in the Korean Intellectual Property Office, Korean Patent Application No. 10-2012-0098332 filed on, Sep. 5, 2012 in the Korean Intellectual Property Office and Korean Patent Application No. 10-2012-0098334 filed on, Sep. 5, 2012 in the Korean Intellectual Property Office, which applications are incorporated by reference herein.

BACKGROUND

The present invention relates to a head lamp for a vehicle and a method of controlling the same, and more particularly, to a head lamp for a vehicle and a method of controlling the same which are capable of expressing various images using a movable lamp.

In general, a vehicle is provided with various lamps for illuminating various areas around and within the vehicle. These lamps allow a driver to easily identify objects within the periphery of the vehicle when the vehicle is driven at night, and provide a signal function that informs other drivers or persons around the vehicle of a driving state of the vehicle. For example, a head lamp, a fog lamp, and the like are mainly provided for the purpose of providing light, and a turn signal lamp, a tail lamp, a brake lamp, a side marker, and the like are provided for the purpose of signaling. In general, as the lamp for a vehicle, a light source such as a halogen lamp or a high intensity discharge (HID) lamp are commonly used.

Recently, however, as the light source, light emitting diodes have started to be used which have a color temperature of about 5,500 K, which is close to a color temperature of sun light, so as to reduce eye strain that causes fatigue. In addition, light emitting diodes minimize the size of the lamp that is required thus increasing the degree of design freedom of the lamp, and also increasing the economic efficiency because light emitting diodes typically have a semi-permanent lifespan.

In particular, light emitting diodes are help to reduce the complexity of the head lamp, increase the lifespan of the light source and are much smaller in size, thus being able to be used in must smaller spaces. Thus, when a light emitting diode is used, one or more light emitting diodes may be used in order to irradiate light in each beam pattern and secure a sufficient quantity of light.

In the related art, the head lamp for a vehicle has a static structure in which a head lamp A forms predetermined light distribution in response to a control signal without expressing a special image or a special shape when the head lamp A is turned on as illustrated in FIG. 2 after the vehicle is driven in a state in which the head lamp A is turned off as illustrated in FIG. 1.

A demand for various means to express personality of a vehicle driver while departing from the structure of the traditional and standardized vehicle has gradually increased, and in response to the demand, a new configuration of the head lamp is required to raise design satisfaction of the vehicle driver and provide personalized lighting.

SUMMARY

The present invention has been made in an effort to provide a head lamp for a vehicle and a method of controlling the same which are capable of generating a dynamic image when a head lamp is turned on or off.

The objects of the present invention are not limited to the aforementioned object, and other objects, which are not mentioned above, will be apparently understood by the person skilled in the art from the following description.

An exemplary embodiment of the present invention provides a head lamp for a vehicle including: a first lamp module; and a second lamp module disposed at a front side of the first lamp module, in which a mode of the second lamp module is set to one of a first mode in which a portion of the second lamp module is overlapped with the first lamp module on a light proceeding path, and a second mode in which the second lamp module is not overlapped with the first lamp module.

Another exemplary embodiment of the present invention provides a method of controlling a head lamp for a vehicle, including: turning on, by a controller, a second lamp module disposed at a front side so as to be overlapped with a first lamp module on a light proceeding path; moving, by the controller, the second lamp module to a position where the second lamp module is not overlapped with the first lamp module; and turning on, by the controller, the first lamp module, in which the second lamp module includes a plurality of lamps.

Yet another exemplary embodiment of the present invention provides a method of controlling a head lamp for a vehicle, including: turning off, by the controller, a first lamp module; and moving, by the controller, a second lamp module, which is disposed at a front side so as to be overlapped with the first lamp module on a light proceeding path, to a position where the second lamp module is overlapped with the first lamp module, in which the second lamp module includes a plurality of lamps.

Specific items of other exemplary embodiments are included in the detailed description and the drawings.

According to the head lamp for a vehicle and the method of controlling the same of the present invention, as described above, there are one or more effects as follows.

That, according to the head lamp for a vehicle according to the exemplary embodiments of the present invention, various images and shapes may be expressed when the head lamp is turned on or off.

In addition, the head lamp is configured by a plurality of lamps, and the respective lamps are moved by moving means (e.g., actuator) so as to be in a state in which the lamps are overlapped with each other or in a state in which the lamps are not overlapped with each other, thereby expressing a dynamic aesthetic appearance.

Particularly, the head lamp for a vehicle is configured to be similar to a shape of how a closed eye is opened when the head lamp is turned on, or the head lamp for a vehicle is configured to be similar to a shape of how an aperture of a camera is opened and closed, thereby providing a sense of closeness and a sense of unity to the vehicle, and expressing a special design aesthetic appearance.

The effects of the present invention are not limited to the aforementioned effects, and other effects, which are not mentioned above, will be apparently understood by the person skilled in the art from the recitations of the claims.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
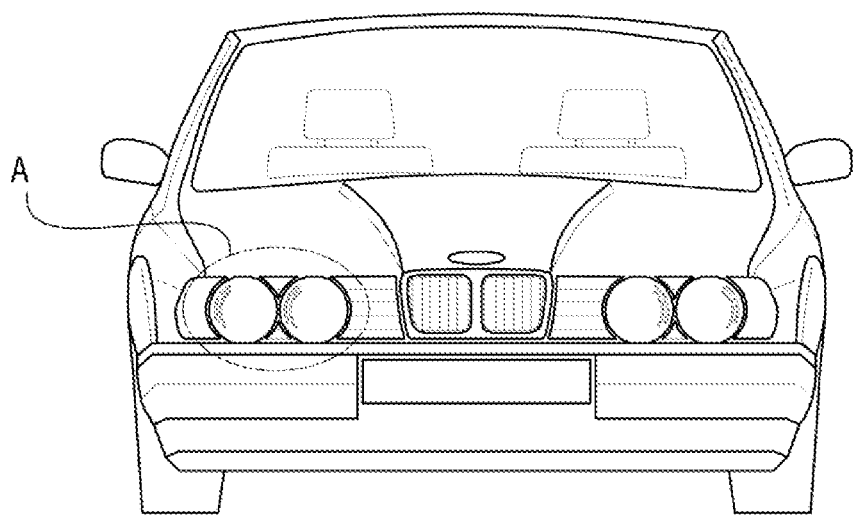
FIGS. 1 and 2 are views illustrating a structure of a head lamp for a vehicle which is applied to a vehicle of the related art.
Figure 2:
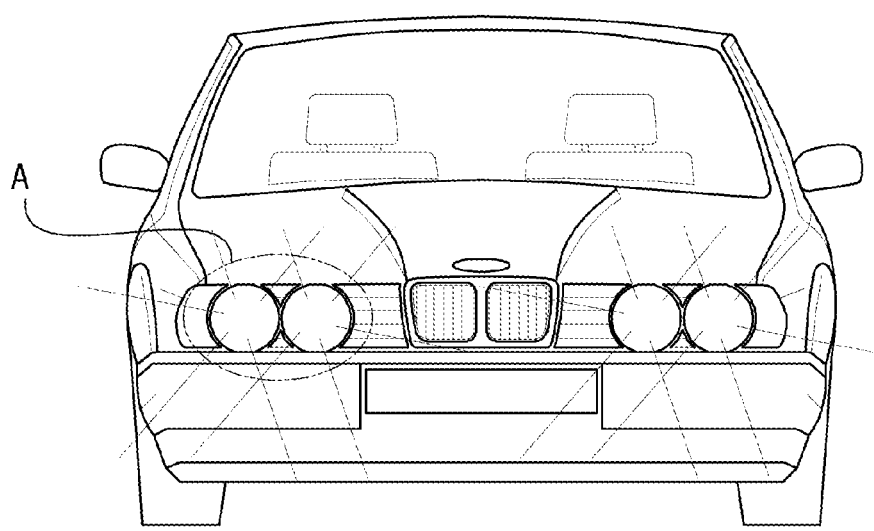

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Specific contents for implementing the present invention will be described in detail with reference to the following accompanying drawings.

Figure 3:
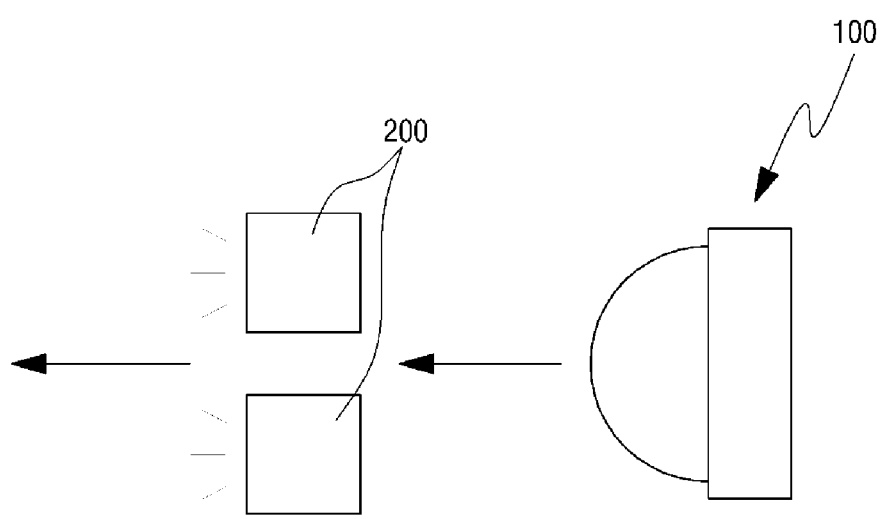
FIGS. 3 and 4 are views illustrating a schematic structure of a head lamp for a vehicle according to an exemplary embodiment of the present invention.
Figure 4:
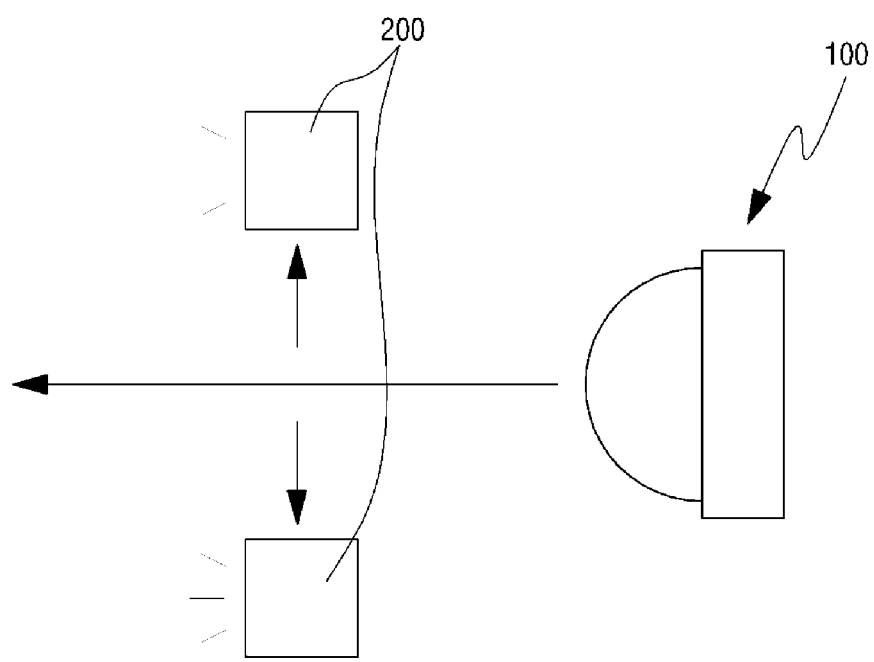
Figure 5:
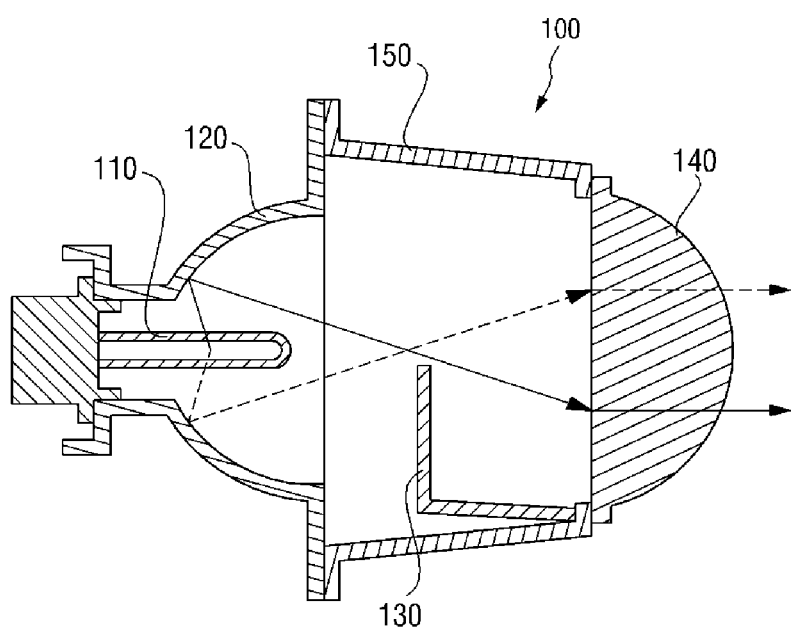
FIG. 5 is a view illustrating a configuration of a first lamp module of the head lamp for a vehicle according to the exemplary embodiment of the present invention.

FIGS. 3 and 4 are views illustrating a schematic structure of a head lamp for a vehicle according to an exemplary embodiment of the present invention, and FIG. 5 is a view illustrating a configuration of a first lamp module of the head lamp for a vehicle according to the exemplary embodiment of the present invention.

Referring to FIGS. 3 and 4, a head lamp for a vehicle according to an exemplary embodiment of the present invention may include a first lamp module 100, and second lamp modules 200.

The first lamp module 100 generates light using a predetermined light source, and provides light to a front side along an optical axis. The first lamp module 100 may form a low beam or a high beam in accordance with a light distribution pattern. In addition, the low beam and the high beam may be dynamically and alternatingly formed by a single module in accordance with a light blocking structure.

A light source having a larger light quantity than that of a light source of the second lamp module 200 may be used in the first lamp module 100, and the first lamp module 100 may have a wider light emitting area than that of the second lamp module 200. A detailed structure of the first lamp module 100 will be described below with reference to FIG. 5.

The second lamp modules 200 are disposed at a front side of the first lamp module 100. The second lamp module 200 may emit light to the front side, and for example, may be configured as a positioning lamp, or a daytime running lamp (DRL).

The second lamp module 200 may be disposed at a predetermined position on the optical axis of the first lamp module 100, and the second lamp module 200 may be positioned at an initial position where a portion of the second lamp module 200 is overlapped with the first lamp module 100 on a light proceeding path.

Referring to FIG. 3, a first mode in which a portion of the second lamp module 200 is overlapped with the first lamp module 100 is illustrated.

Referring to FIG. 4, a second mode in which the second lamp module 200 is displaced to a position where the second lamp module 200 is not overlapped with the first lamp module 100 is illustrated.

That is, when viewing the head lamp for a vehicle according to the exemplary embodiment of the present invention from the front side thereof, in a state illustrated in FIG. 3, a state is maintained in which a portion of or the entirety of the first lamp module 100 is not exposed to the outside while being shielded by the second lamp modules 200, but as illustrated in FIG. 4, the first lamp module 100, which is shielded by the second lamp modules 200, may be exposed by gradually moving or rotating the second lamp modules 200 in a predetermined direction in accordance with a predetermined control signal.

In the first mode, the first lamp module 100 may be turned off and the second lamp modules 200 may be turned on, and in the second mode, the first lamp module 100 and the second lamp modules 200 may be turned on.

As such, the first lamp module 100 is exposed to or concealed from the outside, thereby providing a dynamic image and an esthetic appearance.

For example, in a case in which the second lamp modules 200 are configured to resemble an eye line of a person, and the first lamp module 100 is configured to resemble an eye of a person, a vehicle to which the head lamp for a vehicle according to the exemplary embodiment of the present invention is applied may implement an image showing an operation of opening or closing an eye by a control signal.

In addition, in a case in which the second lamp modules 200 are configured to resemble a shape of an aperture of a camera, and the first lamp module 100 is configured to resemble a camera lens, the vehicle to which the head lamp for a vehicle according to the exemplary embodiment of the present invention may implement a dynamic image showing an operation of opening or closing the aperture of the camera in the form of a spiral and providing an esthetic appearance by a control signal.

In the first mode, the second lamp module 200 may be a daytime running lamp, and in the second mode, the second lamp module 200 may be a positioning lamp.

Referring to FIG. 5, an exemplary configuration of the first lamp module 100 according to the exemplary embodiment of the present invention is illustrated.

The first lamp module 100 includes a first light source 110, a first reflector 120 configured to reflect light generated from the first light source 110, a first optical shield 130 disposed at a front side of the first light source 110 and configured to block a portion of the light, a first lens 140 configured to emit/radiate the incident light to the front side, and a cover member 150 configured to cover internal structures such as the first light source 110.

The first light source 110 is a light emitting module that generates light and may be a projection type of light source. The projection type of head lamp has characteristics of collecting light to one place, and therefore is beneficial in terms of light distribution in comparison with a general clear type, and may provide a sporty and esthetic appearance in respect to a shape of the front surface of the vehicle. For example, the first light source 110 may include a discharge bulb, and a light emitting unit which emits light due to the discharge bulb, and for example, the discharge bulb may be a metal-halide bulb.

The first light source 110 generates a predetermined light and provides the generated light to the outside. Although it is illustrated that the first light source 110 has a single light source structure, the present invention is not limited thereto, and a plurality of light sources may be formed as a single unit so as to generate light.

The first reflector 120 serves to guide light to a desired position by reflecting light emitted from the first light source 110. The first reflector 120 may be formed to be adjacent to the first light source 110, and configured in the form of a hemisphere as illustrated, so as to secure a reflection path of the generated light, but the present invention is not limited thereto.

Among the light emitted/radiated from the first light source 110, the light emitted in an upper direction is reflected on an inner reflection surface of the first reflector 120 and then proceeds in a lower direction, and the light emitted in the lower direction is reflected on the inner reflection surface of the first reflector 120 and then proceeds in the upper direction. Except for when the vehicle irradiates a high beam, the light, which is emitted in the lower direction and then proceeds in the upper direction, is blocked by the first optical shield 130 so as to be configured not to inconvenience other drivers.

In the cross-sectional view, one end of the first reflector 120 is adjacent to the first light source 110, and the other end of the first reflector 120 may be extended to a position where the first reflector 120 comes into contact with the cover member 150.

In several other exemplary embodiments, a scattered reflection layer or a diffuse layer may be formed on a surface of the first reflector 120. That is, when the light is emitted from the first light source 110, the light may be emitted through the first lens 140 at the front side in a state in which the light is uniformly spread by being irregularly and diffusely reflected by the first reflector 120. In this case, the light emitted through the first lens 140 may have brightness that shows overall uniform distribution like a type of light emitted from a surface light source. The scattered reflection layer formed on the surface of the first reflector 120 may include fine unevenness in a repetitive form, and light may be irregularly reflected due to the fine unevenness so as to have overall uniform brightness.

As described above, the first optical shield 130 forms a boundary line or a boundary surface of the light distribution pattern projected toward the front side. A portion of the light is blocked by the first optical shield 130, and the remaining light passes over the first optical shield 130, is refracted by the first lens 140, and proceeds toward the front side.

Here, by blocking the light, which enters at a predetermined height or more of the first lens 140, using the first optical shield 130, a low beam pattern may be formed at a lower portion of a cutoff line. A basic light distribution pattern of the low beam may have a light and darkness boundary line formed by projecting a shape of an edge of an end of the first optical shield 130. The light and darkness boundary line is configured as a horizontal cutoff line, and in the basic light distribution pattern, a high luminosity region (hot zone) may be formed in the vicinity of a lower side of the cutoff line of the light and darkness boundary line.

The structure of the first lamp module 100 is merely illustrative, the first lamp module 100 may have a projection type of lamp structure as described above or a reflector type of lamp structure, and the first lamp module 100 may also have an LED lamp structure in which a structure thereof is simplified by adopting an LED light source.

Hereinafter, a head lamp for a vehicle according to a first exemplary embodiment of the present invention will be described with reference to FIGS. 6 to 17, and FIGS. 6 to 17 illustrate an example illustrating a second lamp module 200 according to the first exemplary embodiment of the present invention.

In the illustrated example, a portion of the second lamp module 200 may pass through a central portion of the head lamp so that a portion of the first lamp module 100 is shielded in the first mode, and in order to provide an opened-eye-shaped image, the shielded first lamp module 100 may be exposed to the outside by moving the second lamp module 200 in up and down directions of the head lamp in the second mode.

The second lamp module 200 may be configured by a plurality of lamps, and the plurality of lamps is disposed in a shape in which the plurality of lamps encloses the first lamp module 100.

Specifically, in the first exemplary embodiment of the present invention, the second lamp module 200 may include first and second line type lamps 211 and 212 disposed at the front side of the first lamp module 100, drive units 213 connected to end portions of the plurality of line type lamps 211 and 212 and configured to move the first and second line type lamps 211 and 212, and hinge portions 214 configured to divide the first and second line type lamps 211 and 212, and the drive units 213 and the hinge portions 214 may include first and second drive units 213a and 213b, and first and second hinge portions 214a and 214b, respectively, which are provided in the first and second line type lamps 211 and 212, respectively.

The line type lamps 211 and 212 may be provided as a pair of line type lamps as illustrated, but the present invention is not limited thereto, and two or more line type lamps may be provided. The line type lamps 211 and 212 are configured to be rotated about the hinge portions 214a and 214b which are provided in the line type lamps 211 and 212, respectively. That is, in a specific mode as illustrated, a state in which the line type lamps 211 and 212 are bent may be maintained, and in another mode, a state in which the line type lamps 211 and 212 are spread in a straight line may be maintained.

The first line type lamp 211 and the second line type lamp 212 may have the same structure in which the first line type lamp 211 and the second line type lamp 212 are point symmetrical to each other on the basis of a predetermined central point. For example, there may be a structure in which when the first hinge portion 214a of the first line type lamp 211 is formed to be biased toward one side from a central position at a predetermined interval, the second hinge portion 214b of the opposite second line type lamp 212 is formed to be biased toward the other side, which is opposite to the one side, from the central position at a predetermined interval.

Figure 6:
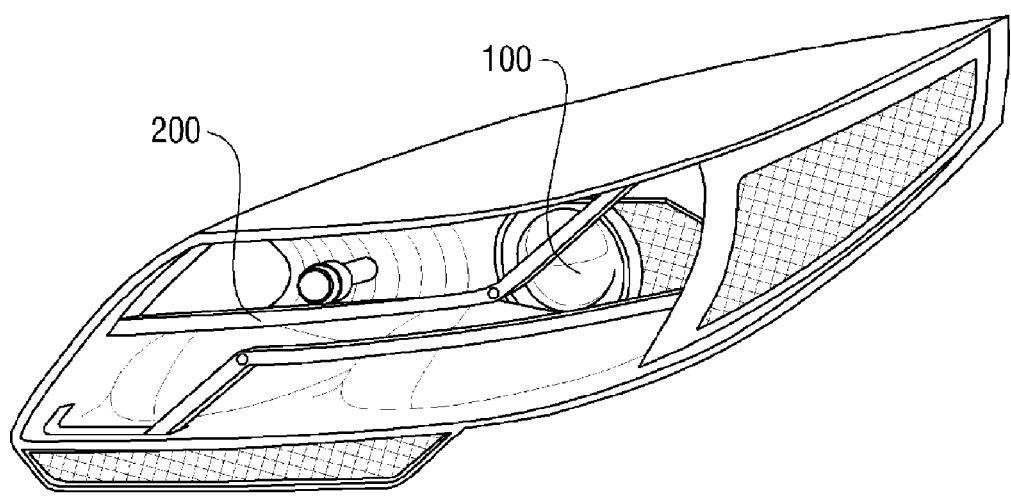
FIGS. 6 and 7 are perspective views illustrating a configuration of a head lamp for a vehicle according to a first embodiment of the present invention.
Figure 7:
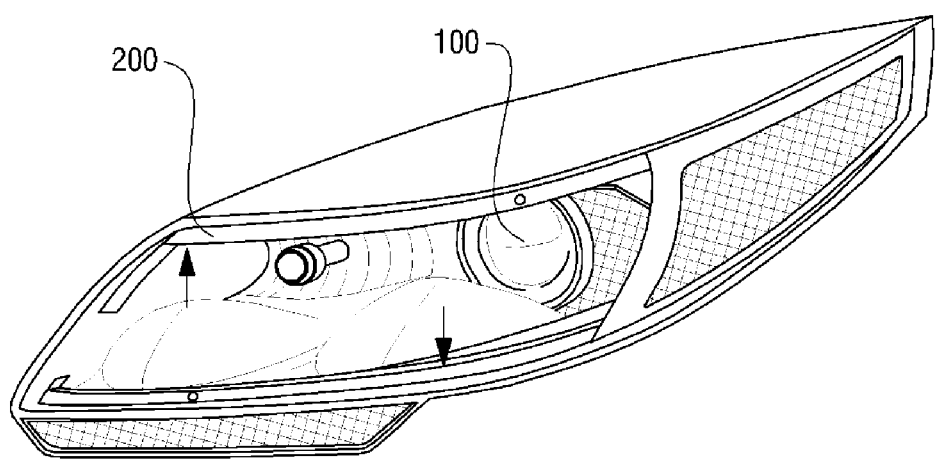

As illustrated in FIGS. 6 and 7, when the mode of the second lamp module 200 is changed from the first mode into the second mode, the first line type lamp 211 and the second line type lamp 212 may be spaced apart from the central portion of the first lamp module 100.

In addition, as illustrated in FIG. 7, when the second lamp module 200 is in the second mode, the first lamp module 100 may be disposed in a space between the first line type lamp 211 and the second line type lamp 212. Here, the description that the first lamp module 100 is disposed in the space between the first line type lamp 211 and the second line type lamp 212 means that the first lamp module 100 is positioned between the first line type lamp 211 and the second line type lamp 212 on the basis of the front view of the head lamp, but does not necessarily mean that the first lamp module 100 is positioned on a virtual line that connects the first line type lamp 211 and the second line type lamp 212 with a straight line.

For example, FIG. 6 illustrates a configuration in which the first mode is set in which the line type lamps 211 and 212, which configure the second lamp module 200, are partially overlapped with the first lamp module 100 in a state in which the line type lamps 211 and 212 are bent at a predetermined angle.

In contrast, FIG. 7 illustrates a configuration in which the second mode is set in which the line type lamps 211 and 212, which configure the second lamp module 200, are not overlapped with the first lamp module 100 in a state in which the line type lamps 211 and 212 are spread in a straight line.

In the illustrated example, a portion of the bar (line) type second lamp module 200 may be aligned to pass through the central portion of the head lamp so that a portion of the first lamp module 100 is shielded in the first mode, and in order to provide an opened-eye-shaped image, the shielded first lamp module 100 may be exposed to the outside by moving the second lamp module 200 in up and down directions of the head lamp in the second mode.

Parts (divided portions) of the pair of line type lamps 211 and 212, which configures the second lamp module 200, are disposed to be parallel to each other, and a plurality of guide grooves may be formed at both ends of each of the line type lamps so as to guide a path of the line type lamp.

When a sum of thicknesses of the pair of line type lamps 211 and 212 is greater than a diameter of the first lamp module 100, the first lamp module 100 may be concealed by the second lamp module 200.

Figure 8:
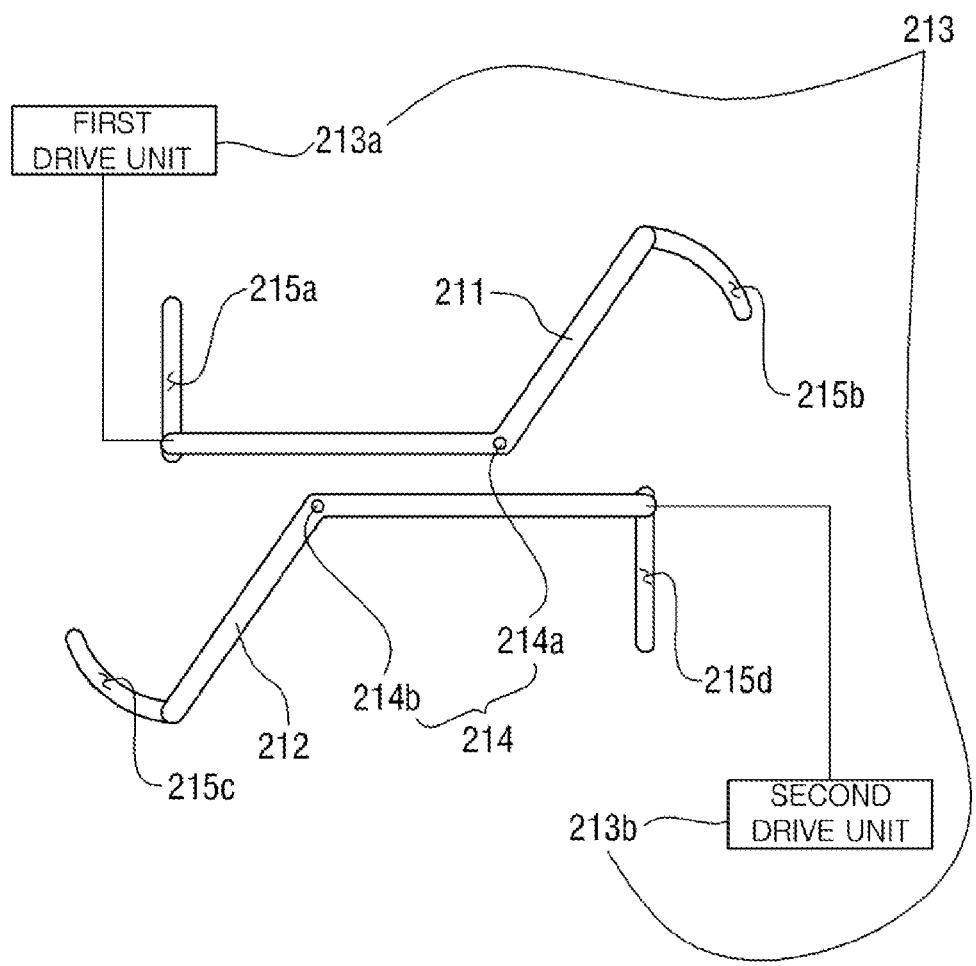
FIGS. 8 and 9 are views illustrating an operational structure of a second lamp module of the head lamp for a vehicle according to the first exemplary embodiment of the present invention.
Figure 9:
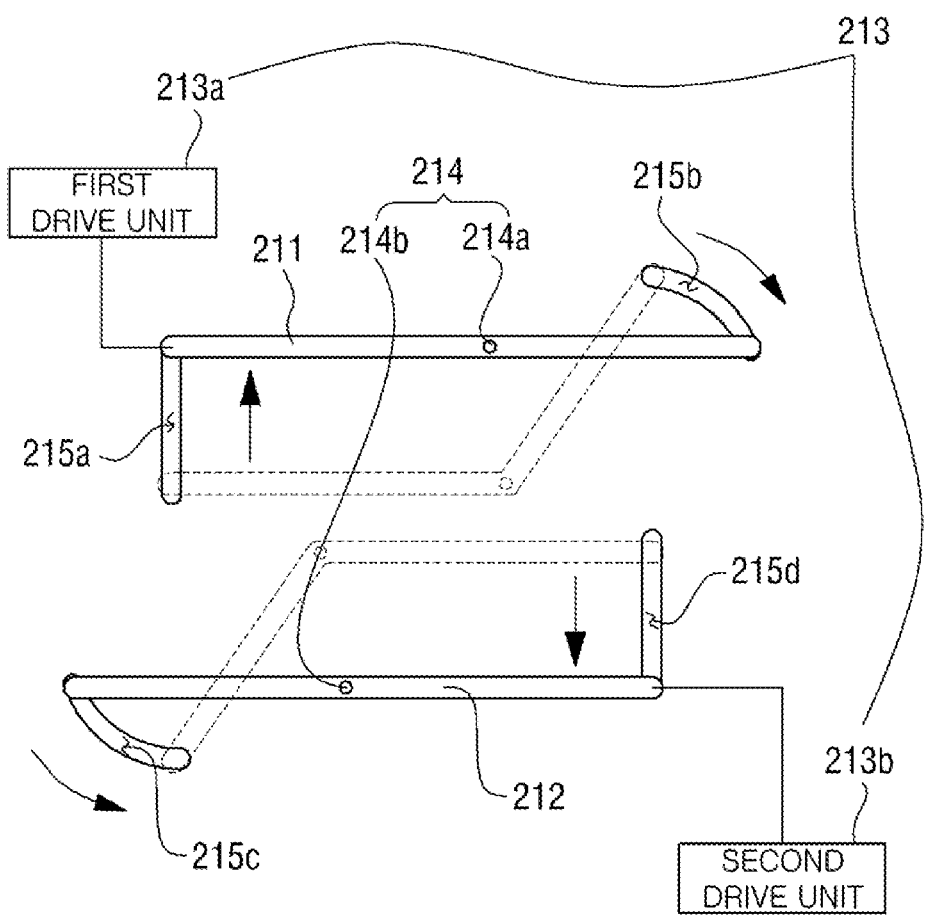

An operational structure of the second lamp module 200 is as illustrated in FIGS. 8 and 9, and the illustrated example, a configuration of the second lamp module 200 for forming a dynamic image or pattern is illustrated.

The second lamp module 200 may include the first line type lamp 211 and the second line type lamp 212, each of the line type lamps 211 and 212 is divided into a first divided portion and a second divided portion on the basis of the hinge portions 214a and 214b, and each of the first divided portion and the second divided portion may be moved along predetermined guide grooves 215a, 215b, 215c and 215d.

Referring to FIG. 8, a left side end of the first line type lamp 211 is connected to a first guide groove 215a, and a right side end of the first line type lamp 211 is connected to a second guide groove 215b. In addition, a left side end of the second line type lamp 212 is connected to a third guide groove 215c, and a right side end of the second line type lamp 212 is connected to a fourth guide groove 215d.

Therefore, the first line type lamp 211 is moved by the first drive unit 213a along the first and second guide grooves 215a and 215b, and the second line type lamp 212 is moved by the second drive unit 213b along the third and fourth guide grooves 215c and 215d.

For example, as illustrated, the first guide groove 215a and the fourth guide groove 215d may have a straight line shape, and the second guide groove 215b and the third guide groove 215c may have a curved line shape, but the present invention is not limited thereto, and shapes and lengths of the guide grooves may be changed. Therefore, each of the divided portions, which are divided by the respective hinge portions 214a and 214b, reciprocates along the respective guide grooves having a straight line shape or a curved line shape such that the first mode (see FIG. 8) is set in which the line type lamps 211 and 212 are overlapped with the first lamp module 100 in a state in which the line type lamps 211 and 212 are bent, or the divided portions may be moved in a direction in which the divided portions are spaced apart from each other so as to be spread in a straight line such that the second mode (see FIG. 9) is set in which the line type lamps 211 and 212 are not overlapped with the first lamp module 100. However, the present invention is not limited thereto, and the line type lamps 211 and 212 may be maintained to be spread in a straight line in the first mode, and may be maintained to be bent in the second mode.

For example, in a case in which one end of the first divided portion (at a left side of the hinge portion) of the first line type lamp 211 is moved to a distal end portion of the first guide groove 215a, and at a different time or at the same time, one end of the second divided portion (at a right side of the hinge portion) of the first line type lamp 211 is moved to a distal end portion of the second guide groove 215b, the first divided portion and the second divided portion are aligned with each other in a straight line and the mode thereof may be set to the second mode, as illustrated in FIG. 9.

As illustrated, the respective divided portions divided by the respective hinge portions 214a and 214b may have different lengths, but the present invention is not limited thereto, and the respective hinge portions 214a and 214b may also be positioned at a center of the respective line type lamps 211 and 212 so that the divided portions are divided to have the same length.

Hereinafter, a detailed structure of the head lamp for a vehicle according to the first exemplary embodiment of the present invention will be described with reference to FIGS. 10 to 13. FIGS. 10 to 13 are views illustrating various structures of the second lamp module 200 according to the first exemplary embodiment of the present invention.

Figure 10:
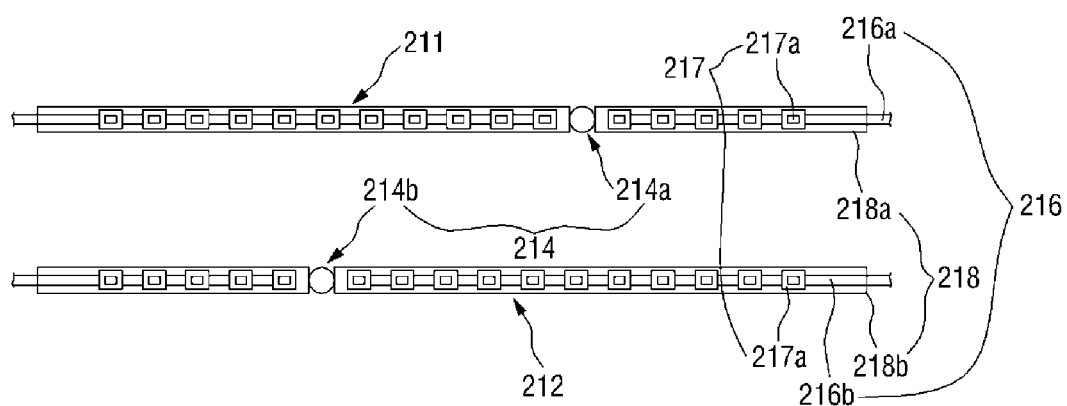
FIGS. 10 to 13 are views illustrating various structures of the second lamp module of the head lamp for a vehicle according to the first exemplary embodiment of the present invention.
Figure 11:
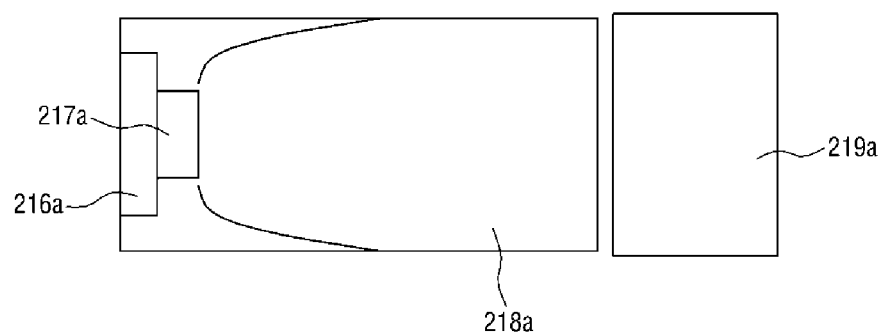

Referring to FIGS. 10 and 11, the second lamp module 200 may include a plurality of optical elements 217 provided in series on circuit boards 216, inner lenses 218 and light guides 219 may be further provided at a front side of the optical elements 217, and the circuit boards 216, the optical elements 217, the inner lenses 218, and the light guides 219 may be provided in the first and second line type lamps 211 and 212, respectively. With respect to the first and second line type lamps 211 and 212, the circuit boards 216 are depicted by 216a and 216b, respectively, the optical elements 217 are depicted by 217a and 217b, respectively, the inner lenses 218 are depicted by 218a and 218b, respectively, and the light guides 219 are depicted by 219a and 219b, respectively. Here, FIG. 11 illustrates an example of the first line type lamp 211, and the second line type lamp 212 may also be configured similarly to the first line type lamp 211.

That is, the optical elements 217 are disposed in a row such that a predetermined light distribution pattern may be formed. The plurality of optical elements 217 may be disposed on the same circuit board 216, and the circuit board 216 may be a band type that is extended to one side, and may be a flexible board.

Because the first and second line type lamps 211 and 212 are divided by the respective hinge portions 214a and 214b, separate circuit boards 216 may be provided at both sides on the basis of regions where the first and second line type lamps 211 and 212 are divided by the respective hinge portions 214a and 214b in order to prevent short-circuits of the circuit boards 216. For example, the plurality of optical elements 217a, which is provided at the first divided portion (at the left side of the hinge portion) of the first line type lamp 211, may be operated by a predetermined first signal, the plurality of optical elements 217a, which is provided at the second divided portion (at the right side of the hinge portion) of the first line type lamp 211, may be operated by a predetermined second signal, and the respective signals may be independently applied to the respective circuit boards 216.

Therefore, the plurality of optical elements 217 may be controlled while a state in which the line type lamps 211 and 212 may be rotated on the basis of the respective hinge portions 214a and 214b is maintained.

The plurality of optical elements 217 is disposed on the circuit boards 216, and the inner lenses 218 may be disposed to enclose the respective optical elements 217 and the respective circuit boards 216. The inner lens 218 may serve to guide the light generated from the optical elements 217 to the front side.

In addition, the light guide 219 may be additionally provided at the front side of the inner lens 218, and the light guide 219 may serve to concentrate or diffuse the light so as to form a predetermined light pattern.

In several other exemplary embodiments, one configuration of the inner lens 218 and the light guide 219 may be omitted.

Figure 12:
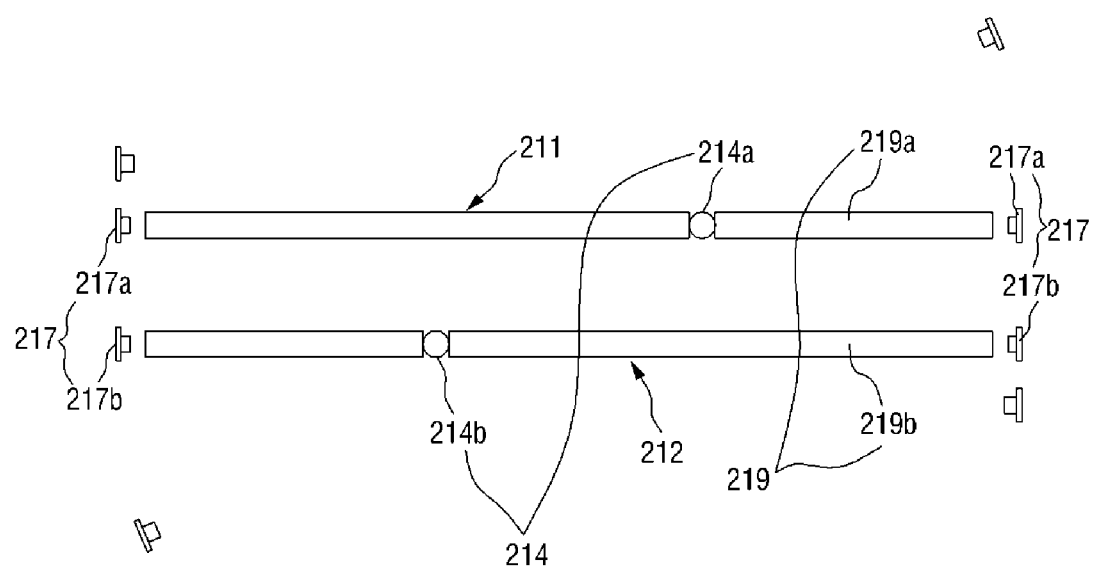
Figure 13:
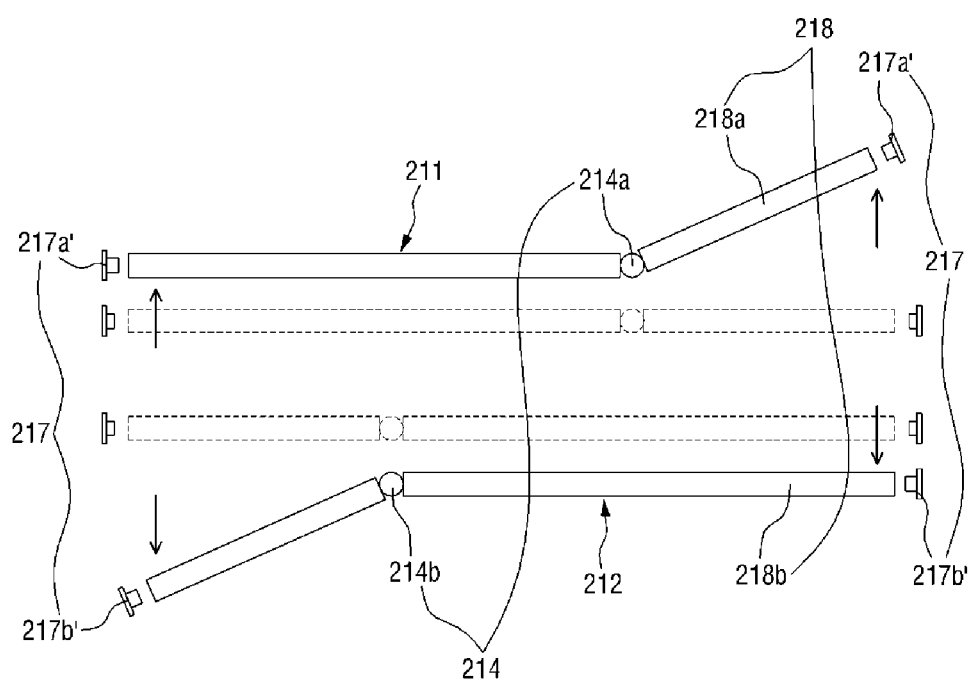

Referring to FIGS. 12 and 13, a configuration in which the optical elements 217 are disposed outside the first and second line type lamps 211 and 212 is disclosed. That is, the first and second line type lamps 211 and 212 are configured by light guides 219a and 219b that are divided by the respective hinge portions 214a and 214b, and the optical elements 217, which are light sources, may be provided at both ends of the light guides 219a and 219b, respectively, so as to provide the light from the optical elements 217 to the light guides 219a and 219b.

In the illustrated example, due to a configuration in which the line type lamps 211 and 212 are divided by the hinge portions 214a and 214b, an example in which the plurality of light sources is provided at both end portions of the respective line type lamps 211 and 212 is illustrated, but the present invention is not limited thereto, and in a case in which there are no hinge portions 214a and 214b, the optical elements 217 may be provided only at one side of the respective line type lamps 211 and 212.

Each of the divided portions, which are divided by the hinge portions 214a and 214b, reciprocates along the respective guide grooves having a straight line shape or a curved line shape such that the first mode (see FIG. 12) in which the line type lamps 211 and 212 are overlapped with the first lamp module 100 may be set, or the divided portions are moved in a direction in which the divided portions are spaced apart from each other such that the second mode (see FIG. 13) in which the line type lamps 211 and 212 are not overlapped with the first lamp module 100 may be set. Here, in accordance with the first mode and the second mode, the optical elements 217 having different colors are disposed at one end or both ends of positions where the line type lamps 211 and 212 are disposed, such that the color of the second lamp module 200 in the first mode and the color of the second lamp module 200 in the second mode may be set to be different from each other.

For example, in the first mode, the first optical elements 217a, which generate white light, are disposed at both ends of the position where the first line type lamp 211 is disposed, such that the second lamp module 200 may irradiate the white light to the front side so as to serve as a daytime running lamp.

In contrast, when the mode of the first line type lamp 211 is changed into the second mode, as illustrated in FIG. 13, second optical elements 217a', which generate orange light, are disposed at both ends of the position where the first line type lamp 211 is disposed, such that the second lamp module 200 may irradiate the orange light to the front side so as to serve as a positioning lamp.

The disposition of color may be changed to be different in accordance with usage of the lamp, and in this case, positions of the first optical element 217a and the second optical element 217b may be fixed.

Each of the light guides 219a and 219b guides light incident from one side or both sides so as to control the light to be uniformly emitted from the first and second line type lamps 211 and 212.

Hereinafter, referring to FIGS. 14 to 17, opened-eye-shaped images, which are implemented by the first lamp module 100 and the second lamp module 200 according to the first exemplary embodiment of the present invention, are sequentially illustrated.

Figure 14:
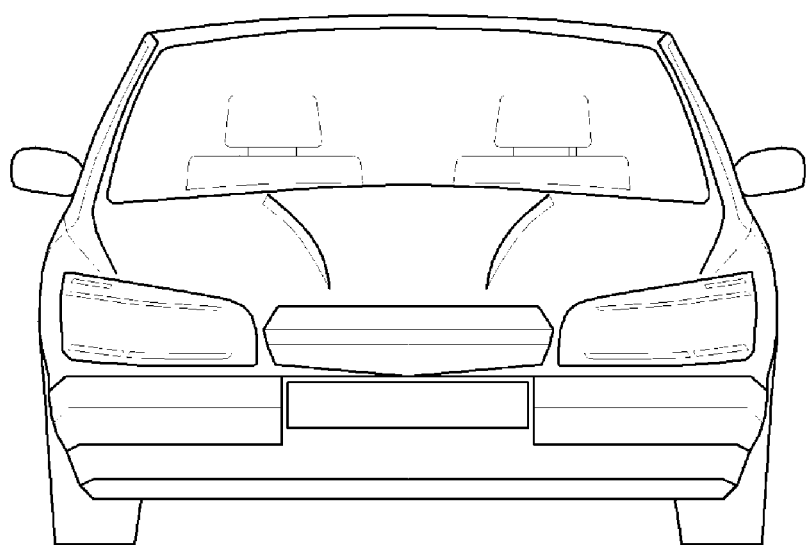
FIGS. 14 to 17 are views illustrating a sequence of operations of the head lamp for a vehicle according to the first exemplary embodiment of the present invention.

As illustrated in FIG. 14, in an initial state, the first lamp module 100 and the second lamp module 200 may be turned off, but the present invention is not limited thereto, and in several other exemplary embodiments, only the second lamp module 200 may be turned on. In addition, in several other embodiments, a state in which both the first lamp module 100 and the second lamp module 200 are turned on is maintained, but there may be a configuration in which the light generated from the first lamp module 100 is blocked from being transmitted to the front side while the first lamp module 100 is overlapped by the second lamp module 200.

Figure 15:
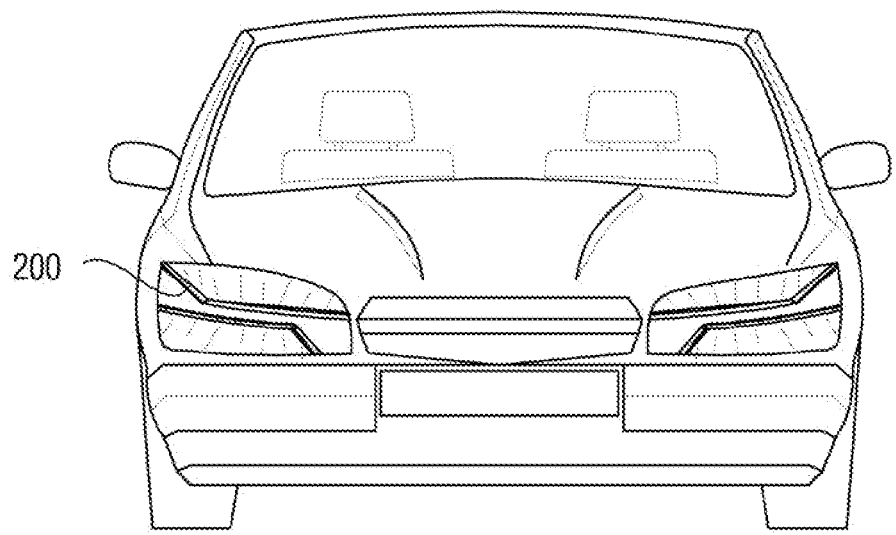

Next, as illustrated in FIG. 15, in a state in which the first lamp module 100 and the second lamp module 200 are turned off, the second lamp module 200, which resembles an eye line of a person, is turned on. A position relationship between the first lamp module 100 and the second lamp module 200 is maintained to correspond to the first mode. That is, when the mode of the second lamp module 200 is the first mode, a state in which the first lamp module is turned off and the second lamp module 200 is turned on may be maintained.

Figure 16:
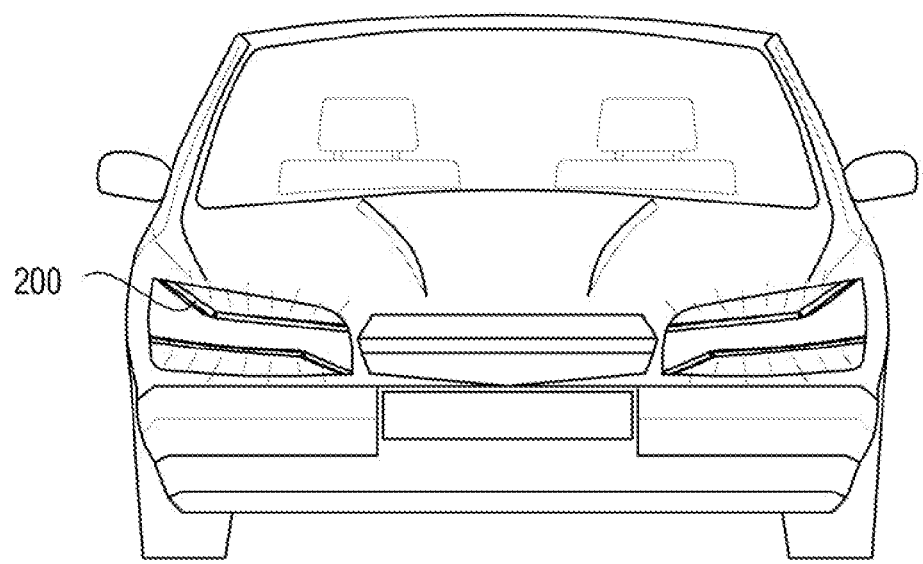

Next, FIG. 16 illustrates a state in which the second lamp module 200 is moved to a position where a portion of the second lamp module 200 is not overlapped with the first lamp module 100 such that a portion of the first lamp module 100 is exposed to the outside. The above state refers to an intermediate state when the mode is changed from the first mode into the second mode. In a case in which the second lamp module 200 is configured by a plurality of lamps, when the mode is changed from the first mode into the second mode, the plurality of lamps may be moved in a direction in which an interval between the plurality of lamps becomes wider.

In addition, in the second lamp module 200, when the mode is changed from the first mode into the second mode, the portion where the second lamp module 200 is overlapped with the first lamp module 100 may be gradually decreased. That is, the portion of the first lamp module 100, which is shielded by the second lamp module 200, may be gradually decreased.

In addition, in several other exemplary embodiments, when the mode is changed from the first mode into the second mode, the second lamp module 200 may be configured to be spaced apart from the central portion of the first lamp module 100. For example, in a state in which the second lamp module 200 is aligned on the basis of the central portion of the first lamp module 100, the second lamp module 200 is moved in a direction in which the second lamp module 200 is spaced apart from the central portion of the first lamp module 100 such that the mode may be changed from the first mode into the second mode.

Figure 17:
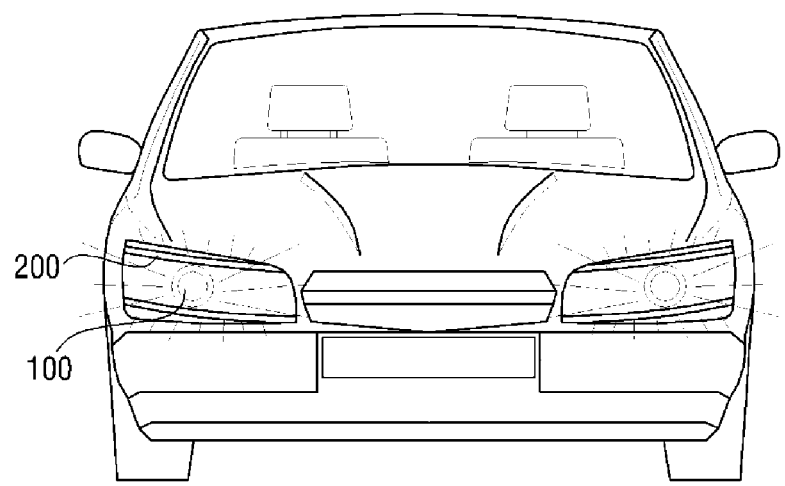

Next, as illustrated in FIG. 17, the mode of the second lamp module 200 of the head lamp according to the first exemplary embodiment of the present invention is completely changed from the first mode into the second mode, and the first lamp module 100 is turned on, thereby completing an opened-eye-shaped image obtained by humanizing the vehicle. As such, the first lamp module 100 may be turned on after the mode of the second lamp module 200 is changed from the first mode into the second mode, but the present invention is not limited thereto, and in contrast, the mode of the second lamp module 200 may be changed from the first mode into the second mode after the first lamp module 100 is turned on, and the operation of turning on the first lamp module 100 and the operation of changing the mode of the second lamp module 200 into the second mode may be performed at the same time.

That is, when the mode of the second lamp module 200 is the second mode, the first lamp module 100 and the second lamp module 200 may be turned on.

In a sequence opposite to the illustrated sequence, the mode of the second lamp module 200 of the head lamp for a vehicle according to the first exemplary embodiment may be changed from the second mode into the first mode, and in this case, the aforementioned processes illustrated in FIGS. 14 to 17 may be reversely performed. In this case, a closed-eye-shaped image may be expressed.

Hereinafter, a head lamp for a vehicle according to a second exemplary embodiment of the present invention will be described with reference to FIGS. 18 to 21. Unlike the aforementioned first exemplary embodiment in which the first and second line type lamps 221 and 222 are bent or spread in a straight line, FIGS. 18 to 21 illustrate an example in which first and second line type lamps 221 and 222 are formed to be extended in a straight line so as to be maintained in a parallel state even when the mode is changed. In the second exemplary embodiment of the present invention, because the functions, the position relationships for each mode, and the like of the first and second line type lamps 221 and 222 are similar to the aforementioned first exemplary embodiment, a detailed description thereof will be omitted.

A second lamp module 200 according to the second exemplary embodiment of the present invention may include first and second line type lamps 221 and 222 disposed at a front side of a first lamp module 100 and extended in a straight line, and drive units 223 connected to end portions of the first and second line type lamps 221 and 222 and configured to move the first and second line type lamps 221 and 222, and the first line type lamp 221 and the second line type lamp 222 may be disposed to face each other. In addition, the drive units 223 may include first and second drive units 223*a* and 223*b* that are provided at the first and second line type lamps 221 and 222, respectively.

As illustrated, the first line type lamp 221 and the second line type lamp 222 may be parallel to each other, and when the mode of the first line type lamp 221 and the second line type lamp 222 is changed between the first mode and the second mode, a state in which the first line type lamp 221 and the second line type lamp 222 are parallel to each other may be maintained.

Figure 18:
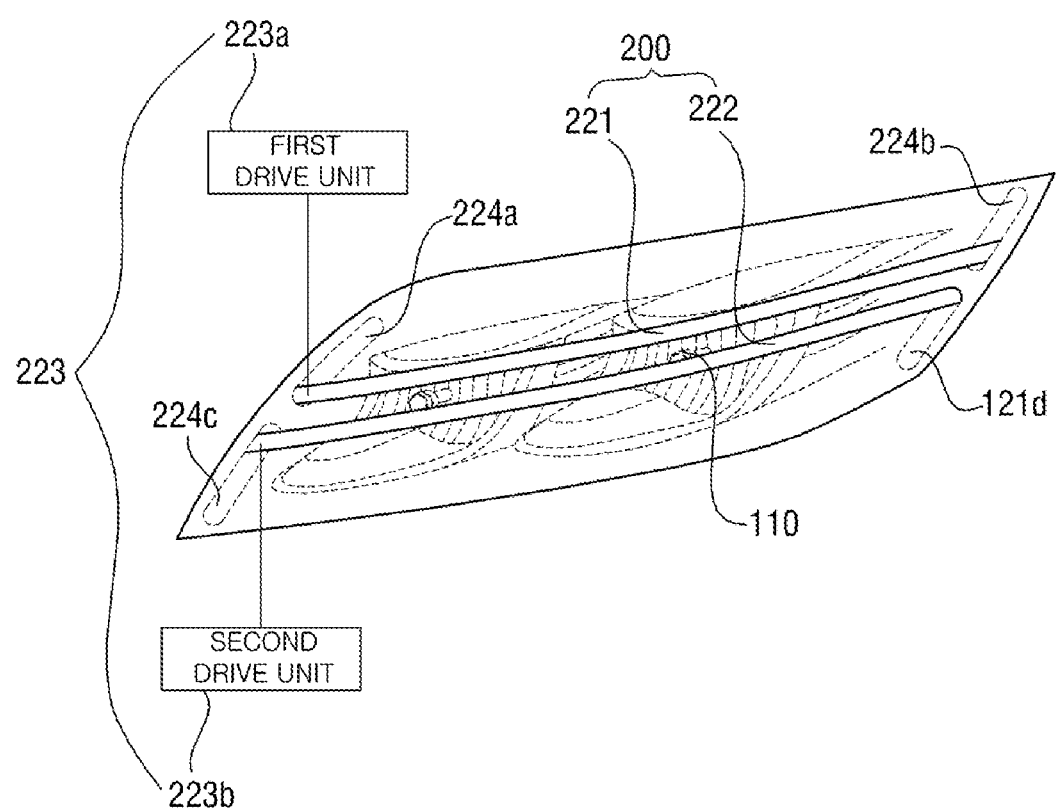
FIGS. 18 and 19 are views illustrating an operational structure of a second lamp module of a head lamp for a vehicle according to a second exemplary embodiment of the present invention.
Figure 19:
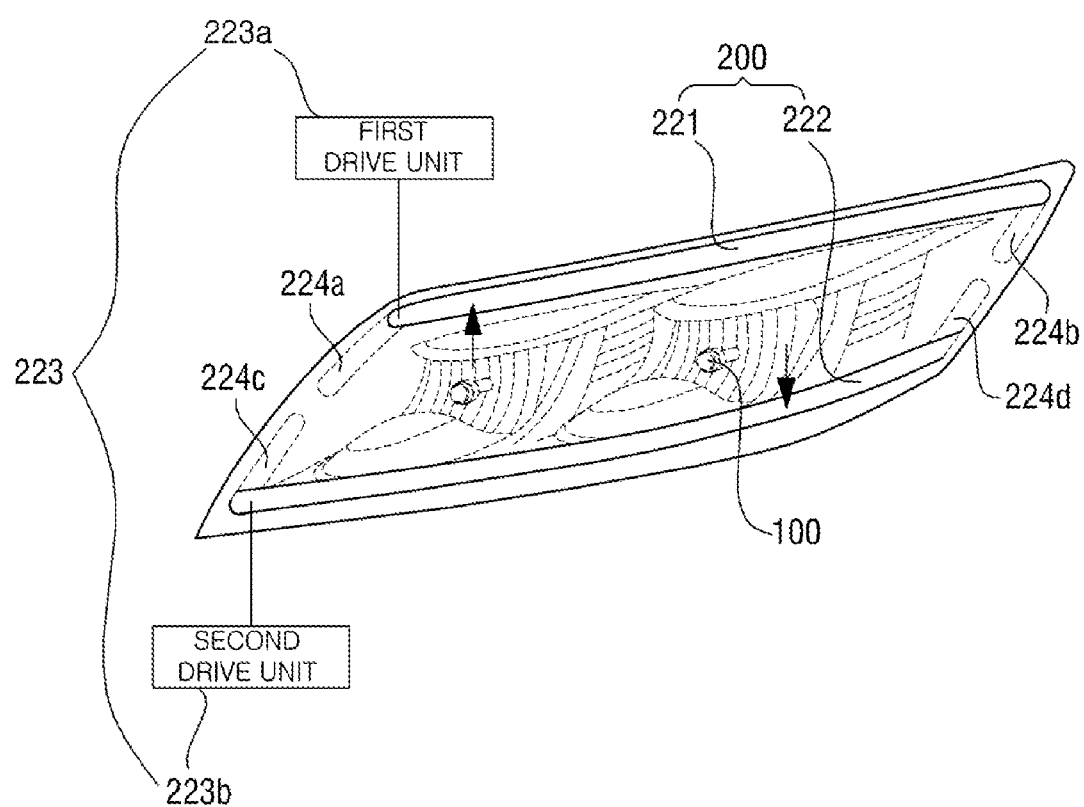

As illustrated in FIGS. 18 and 19, when the mode of the second lamp module 200 is changed from the first mode into the second mode, the first line type lamp 221 and the second line type lamp 222 may be spaced apart from the central portion of the first lamp module 100. Like the illustrated example, when the mode is changed from the first mode into the second mode, the first line type lamp 221 and the second line type lamp 222 may be moved in a direction in which the first line type lamp 221 and the second line type lamp 222 are spaced apart from each other while maintaining the state in which the first line type lamp 221 and the second line type lamp 222 are parallel to each other, and in contrast, when the mode is changed from the second mode into the first mode, the first line type lamp 221 and the second line type lamp 222 may be moved in a direction in which the first line type lamp 221 and the second line type lamp 222 becomes close to each other while maintaining the state in which the first line type lamp 221 and the second line type lamp 222 are parallel to each other.

The second lamp module 200 may include the first line type lamp 221, and the second line type lamp 222, and the respective line type lamps may be moved along predetermined guide grooves 224*a*, 224*b*, 224*c*, and 224*d*.

Referring to FIG. 18, a left side end of the first line type lamp 221 is connected to a first guide groove 224*a*, and a right side end of the first line type lamp 221 is connected to a second guide groove 224*b*. In addition, a left side end of the second line type lamp 222 is connected to a third guide groove 224*c*, and a right side end of the second line type lamp 222 is connected to a fourth guide groove 224*d*.

Therefore, the first line type lamp 221 is moved by the first drive unit 223*a* along the first and second guide grooves 224*a* and 224*b*, and the second line type lamp 222 is moved by the second drive unit 223*b* along the third and fourth guide grooves 224*c* and 224*d*.

For example, as illustrated, the first to fourth guide grooves 224*a*, 224*b*, 224*c*, and 224*d* may have a straight line shape, but the present invention is not limited thereto, and shapes and lengths of the guide grooves may be changed. Therefore, both ends of the first line type lamp 221 and the second line type lamp 222 reciprocate along the guide grooves having a straight line shape or a curved line shape such that the first mode (see FIG. 18) in which the first and second line type lamps 221 and 222 are overlapped with the first lamp module 100 may be set, or both ends of the first line type lamp 221 and the second line type lamp 222 are moved in a direction in which both ends of the first line type lamp 221 and the second line type lamp 222 are spaced apart from each other such that the second mode (see FIG. 19) in which the first and second line type lamps 221 and 222 are not overlapped with the first lamp module 100 may be set.

For example, when one end of the first line type lamp 221 is moved to a distal end portion of the first guide groove 224*a*, and at the same time, the other end of the first line type lamp 221 is moved to a distal end portion of the second guide groove 224*b*, as illustrated in FIG. 19, the first line type lamp 221 may be aligned in a straight line. Similarly, the second line type lamp 222 may also be moved to be aligned so as to be parallel to the first line type lamp 221. As such, the first line type lamp 221 and the second line type lamp 222 are moved along the guide grooves such that the first mode or the second mode may be set.

Meanwhile, similarly to the aforementioned first exemplary embodiment, in the second exemplary embodiment of the present invention, the second lamp module 200 may include a plurality of optical element provided in series on circuit boards, and inner lenses and light guides may be further provided at a front side of the optical elements. Because the above configurations are similar to those of the aforementioned first exemplary embodiment, a detailed description thereof will be omitted.

In addition, similarly to the aforementioned first exemplary embodiment, in the second exemplary embodiment of the present invention, in accordance with the first mode and the second mode, the optical elements having different colors are disposed at one end or both ends of positions where the line type lamps 221 and 222 are disposed, such that the color of the second lamp module 200 in the first mode and the color of the second lamp module 200 in the second mode may be set to be different from each other.

Hereinafter, referring to FIGS. 20 to 21, opened-eye-shaped images, which are implemented by the first lamp module 100 and the second lamp module 200 according to the second exemplary embodiment of the present invention, are sequentially illustrated. Here, in FIGS. 20 and 21, an image of an initial state of the first lamp module 100 and the second lamp module 200, and an image of a state in which the mode of the second lamp module 200 is completely changed from the first mode into the second mode are omitted for explanatory convenience, but in the second exemplary embodiment of the present invention, an image of an initial state of the first lamp module 100 and the second lamp module 200, and an image of a state in which the mode of the second lamp module 200 is completely changed from the first mode into the second mode may be identical to the aforementioned images illustrated in FIGS. 14 and 17.

Figure 20:
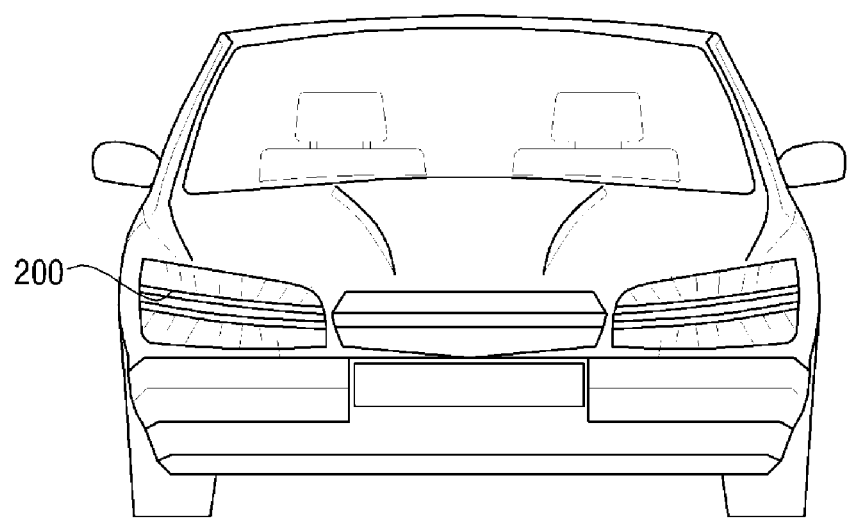
FIGS. 20 and 21 are views illustrating a sequence of operations of the head lamp for a vehicle according to the second exemplary embodiment of the present invention.

That is, in an initial state in which the first lamp module 100 and the second lamp module 200 are turned off as illustrated in FIG. 14, the second lamp module 200, which resembles an eye line of a person, is turned on as illustrated in FIG. 20. A position relationship between the first lamp module 100 and the second lamp module 200 is maintained to correspond to the first mode. That is, when the mode of the second lamp module 200 is the first mode, a state in which the first lamp module is turned off and the second lamp module is turned on may be maintained.

Figure 21:
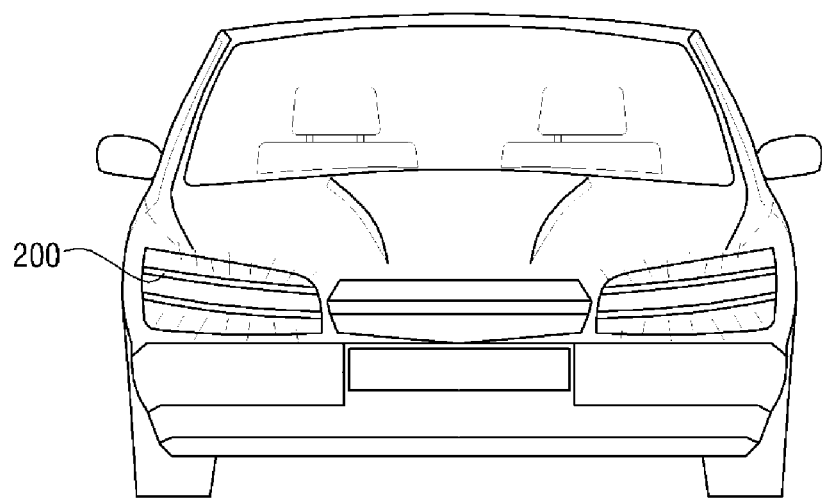

Next, FIG. 21 illustrates a state in which the second lamp module 200 is moved to a position where a portion of the second lamp module 200 is not overlapped with the first lamp module 100 while maintaining the state in which a portion of the second lamp module 200 is parallel to the first lamp module 100 such that a portion of the first lamp module 100 is exposed to the outside. The above state refers to an intermediate state when the mode is changed from the first mode into the second mode. In a case in which the second lamp module 200 is configured by a plurality of lamps, when the mode is changed from the first mode into the second mode, the plurality of lamps may be moved in a direction in which an interval between the plurality of lamps becomes wider.

Next, in the aforementioned state illustrated in FIG. 21, when the mode of the second lamp module 200 of the head lamp according to the second exemplary embodiment of the present invention is completely changed from the first mode into the second mode, similarly to FIG. 17, the first lamp module 100 is turned on, thereby completing an opened-eye-shaped image obtained by humanizing the vehicle.

Hereinafter, a head lamp for a vehicle according to a third exemplary embodiment of the present invention will be described with reference to FIGS. 22 to 31.

In the third exemplary embodiment of the present invention, a second lamp module 200 may include a plurality of line type lamps, the plurality of line type lamps is rotated about respective rotating shafts 231 by a predetermined angle, and a mode of the plurality of line type lamps may be set to one of a first mode in which the plurality of line type lamps is partially overlapped with a first lamp module 100 on a light proceeding path, and a second mode in which the plurality of line type lamps is not overlapped with the first lamp module 100.

Figure 22:
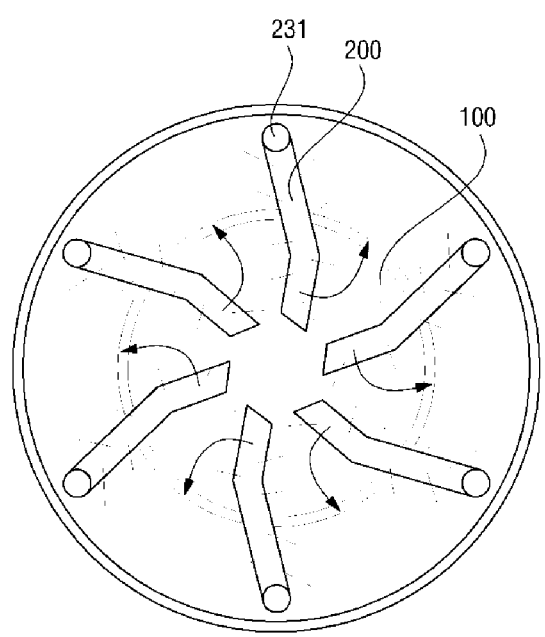
FIGS. 22 to 24 are views illustrating a configuration of a head lamp for a vehicle according to a third exemplary embodiment of the present invention.
Figure 26:
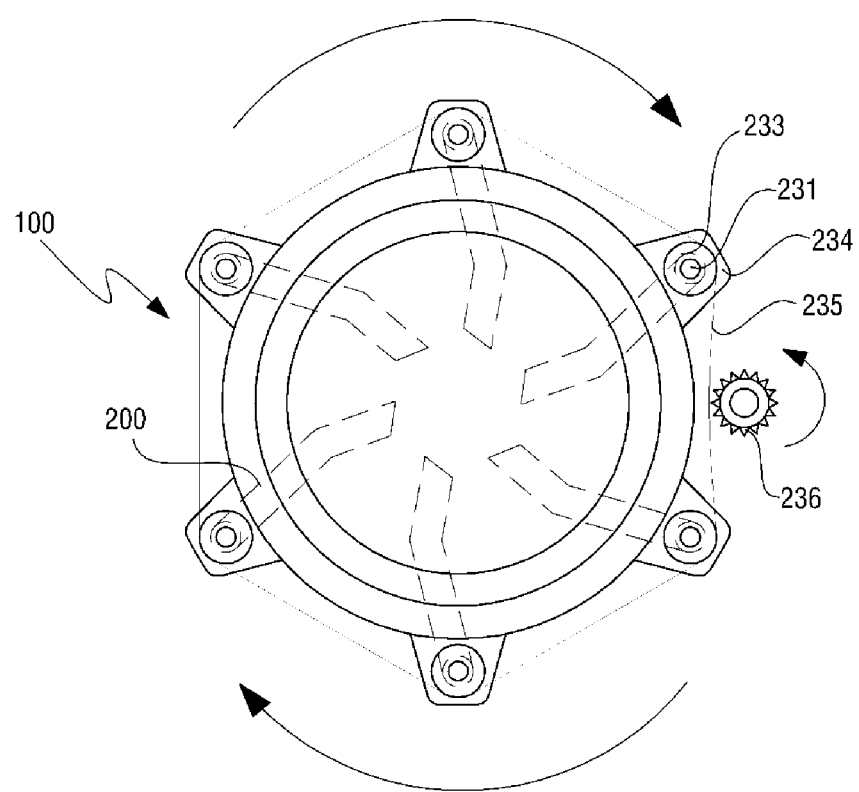

Referring to FIG. 22, the plurality of line type lamps may have a curved portion that is bent at a predetermined angle, respectively, and each of the line type lamps forms a predetermined angle on the basis of the curved portion. In the first mode in which the plurality of line type lamps is partially overlapped with the first lamp module 100 on the light proceeding path, as illustrated in FIG. 26, end portions positioned at opposite sides to the rotating shafts 231 of the plurality of line type lamps may be aligned to be oriented toward a central portion of the first lamp module 100.

As described below with reference to FIG. 24, when the mode of the plurality of line type lamps is set to the second mode, the plurality of line type lamps may be continuously disposed along an outer circumference of the first lamp module 100 in a shape close to a circular shape. To this end, as the number of plurality of line type lamps is increased, a predetermined angle of the curved portion of each of the line type lamps is increased such that the line type lamps may have a shape close to a straight line. In addition, when observing the head lamp from the front side, the rotating shafts 231 of the plurality of line type lamps are disposed outside the first lamp module 100 on a plane, such that when the plurality of line type lamps is rotated about the rotating shafts 231 so as to be set to the second mode, the second lamp module 200 and the first lamp module 100 may be configured not to be overlapped with each other on the plane.

Figure 23:
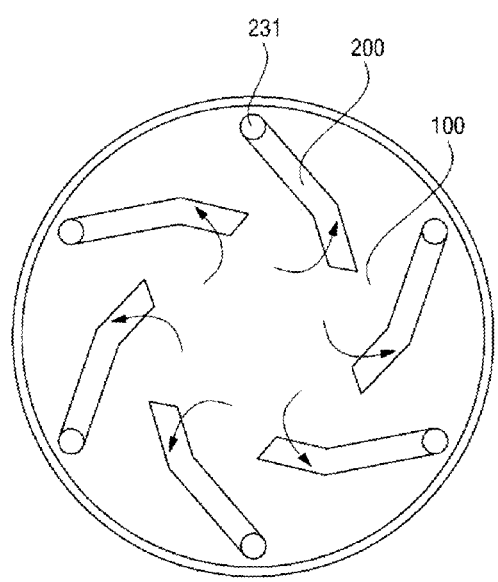

Referring to FIG. 23, the plurality of line type lamps may be rotated in the same direction (counterclockwise direction of the drawing), and the plurality of line type lamps may be simultaneously rotated.

Figure 24:
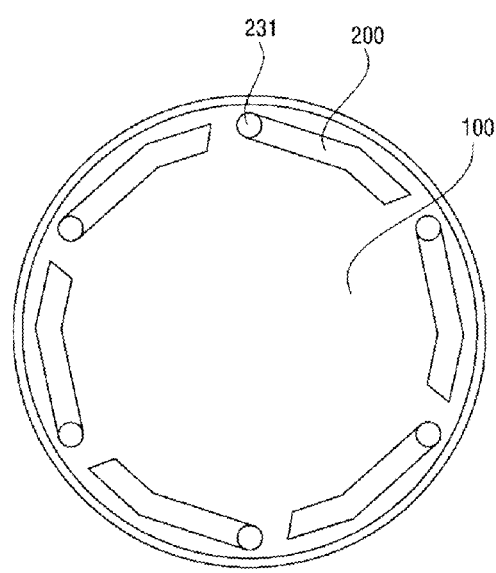

Referring to FIG. 24, a configuration in which the plurality of line type lamps, which configures the second lamp module 200, is aligned to be in the second mode, that is, at a position where the plurality of line type lamps is not overlapped with the first lamp module 100 is illustrated. Because the rotating shafts 231 of the plurality of line type lamps are positioned outside the first lamp module 100, a state in which the first lamp module 100 and the second lamp module 200 are not overlapped with each other may be maintained.

When the mode of the plurality of line type lamps, which configures the second lamp module 200, is the second mode, the end portions positioned at the opposite sides to the rotating shafts 231 of the plurality of line type lamps may be moved from the central portion of the first lamp module 100, which is an initial position, and aligned so as to be oriented toward the rotating shaft 231 of the adjacent another line type lamp. That is, the plurality of line type lamps is aligned to enclose the first lamp module 100, and may be aligned in the same direction so as to have a shape in which one end portion and the other end portion of the line type lamps, which are adjacent to each other, face each other.

In addition, when the mode of the plurality of line type lamps, which configures the second lamp module 200, is the second mode, the first lamp module 100 may be disposed inside the plurality of line type lamps.

Each of the rotating shafts 231 of the line type lamps may be configured by an optical cable through which light is transmitted or a material by which light is totally reflected and transmitted from one end thereof to the other end thereof, and the rotating shaft 231 may be configured to transmit the light, which enters through one end portion of the rotating shaft 231, to a main body of the plurality of line type lamps so that the line type lamps emit light, but the present invention is not limited thereto, and a plurality of optical elements may be provided in the line type lamps so that the line type lamps may autonomously emit light. In this case, the second lamp module 200 may include a plurality of optical elements provided in series on circuit boards, and inner lenses and light guides may be further provided at a front side of the optical elements. Because the above configurations are similar to those of the aforementioned exemplary embodiments, a detailed description thereof will be omitted.

In addition, in accordance with the first mode and the second mode, the optical elements having different colors are disposed at one end (for example, the rotating shafts 231) or both ends of positions where the plurality of line type lamps are disposed, or the optical elements, which emit different types of light in the first mode and the second mode, are disposed, such that the color of the second lamp module 200 in the first mode and the color of the second lamp module 200 in the second mode may be set to be different from each other.

Here, when the mode of the plurality of line type lamps is changed into the first mode or the second mode, light may be supplied by the optical element provided to be adjacent to the rotating shaft 231 of which a position is not changed, and thereby, uniform light may be supplied from the optical element to the plurality of line type lamps regardless of the first mode and the second mode.

Hereinafter, in the third exemplary embodiment of the present invention, a connection structure of the first lamp module 100 and the second lamp module 200 will be described with reference to FIG. 25.

The rotating shafts 231 of the plurality of line type lamps, which configures the second lamp module 200, may be extended in a direction toward the first lamp module 100 so as to be directly or indirectly connected to the first lamp module 100, but the present invention is not limited thereto, and the first lamp module 100 and the rotating shafts 231 may be disposed at separate positions, respectively.

As described above, the first lamp module 100 may further include a first light source 110, a first reflector 120 configured to reflect a portion of the light generated from the first light source 110, and a cover member 150 configured to cover an outer circumferential surface of the first light source 110 or the first reflector 120, and for example, each of the rotating shafts 231 of the plurality of line type lamps may be directly or indirectly connected to the cover member 150.

A second light source 232 may be further provided outside the cover member 150, and as described above, the light emitted from the second light source 232 enters the rotating shaft 231, which is formed in the form of an optical fiber, and the plurality of line type lamps may emit light by receiving light from the light that enters the rotating shaft 231. The number of second light sources 232 may be the same as the number of plurality of line type lamps so that the second light sources 232 and the rotating shafts 231 may be connected to each other one to one, but the present invention is not limited thereto, and light may be provided from the single second light source 232 to the plurality of rotating shafts 231.

A transmission member 233 may be inserted into a predetermined position of each of the rotating shafts 231, and when the transmission member 233 is rotated by external power, the rotating shaft 231 may also be simultaneously rotated according to the rotation of the transmission member 233.

A support member 234 configured to support the rotating shaft 231 may be provided between the second light source 232 and the transmission member 233.

Figure 25:
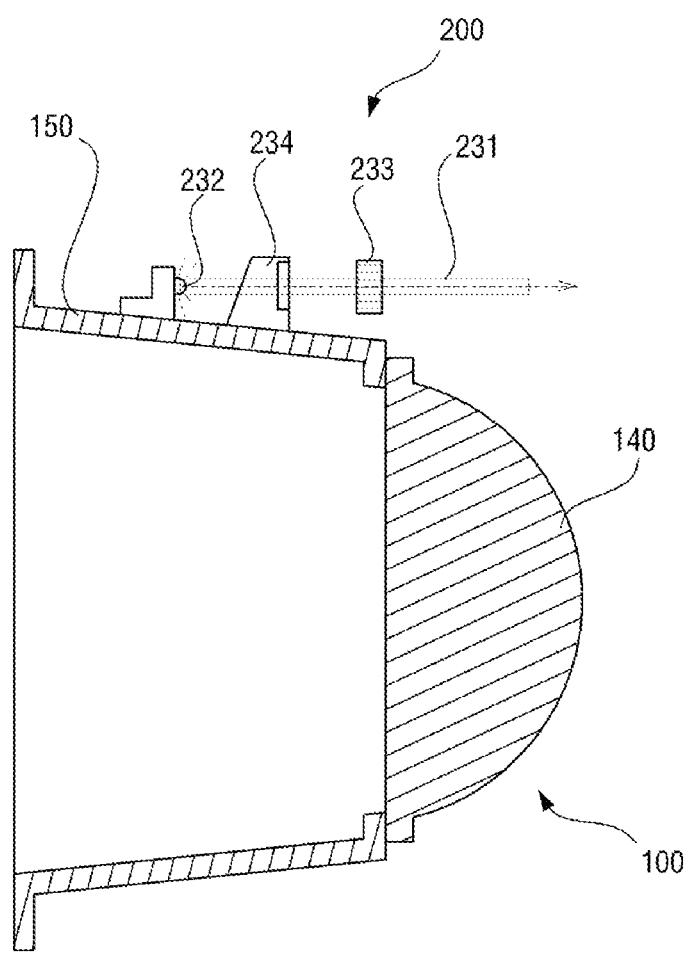
FIGS. 25 to 27 are views illustrating a connection structure and an operational structure of a second lamp module of the head lamp for a vehicle according to the third exemplary embodiment of the present invention.
Figure 27:
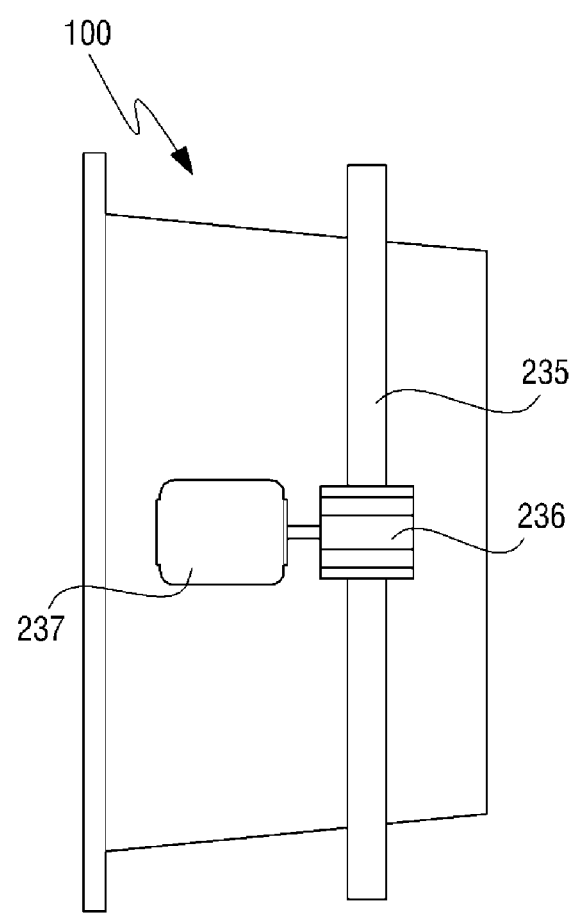

Referring to FIG. 25, a front view with respect to the structure of FIG. 24 is illustrated, and FIG. 27 illustrates a side view of a connection member 235 and a drive motor 237 of FIG. 25.

Referring to FIGS. 25 and 26, the connection member 235 configured to integrally connect the plurality of line type lamps may be further provided, and more specifically, the connection member 235 may connect all the rotating shafts 231 of the plurality of line type lamps. As described above, the transmission members 233 may be provided on the rotating shafts 231 of the plurality of line type lamps, and the transmission members 233 may be provided at positions where the rotating shafts 231 and the connection member 235 come into contact with each other.

The connection member 235 may be configured to integrally connect the rotating shafts 231 so as to allow the rotating shafts 231 to be simultaneously rotated, and for example, may be configured as a belt, a chain, a gear, or the like.

The connection member 235 may be configured to enclose the outside of the first lamp module 100 on a plane, and the transmission members 233 may transmit torque generated by the connection member 235 to the rotating shafts 231.

In addition, the drive motor 237 connected to the connection member 235 and configured to rotate the connection member 235 may be further provided so as to simultaneously transmit external force to all the transmission members 233 connected by the connection member 235, and thereby, the plurality of rotating shafts 231 is rotated such that the plurality of line type lamps may be simultaneously or continuously rotated in a predetermined direction.

In several other exemplary embodiments, configurations of the transmission member 233 and/or the connection member 235 may be omitted, and each of the rotating shafts 231 may be configured to be rotated by a separate power source. In this case, in order to simultaneously rotate the plurality of line type lamps, the plurality of line type lamps may be configured to be rotated in a predetermined direction by simultaneously or continuously operating a plurality of power sources using a sync signal or the like.

Referring to FIG. 26, a coupling portion 236 having a shape of unevenness, gear teeth, or the like may be formed on each surface of the connection member 235 and the drive motor 237 so that the connection member 235 and the drive motor 237 may be engaged with each other.

Hereinafter, referring to FIGS. 28 to 31, opened-eye-shaped images, which are implemented by the first lamp module 100 and the second lamp module 200, are sequentially illustrated. FIGS. 28 to 31 are views illustrating a sequence of operations of the head lamp for a vehicle according to the third exemplary embodiment of the present invention.

Figure 28:
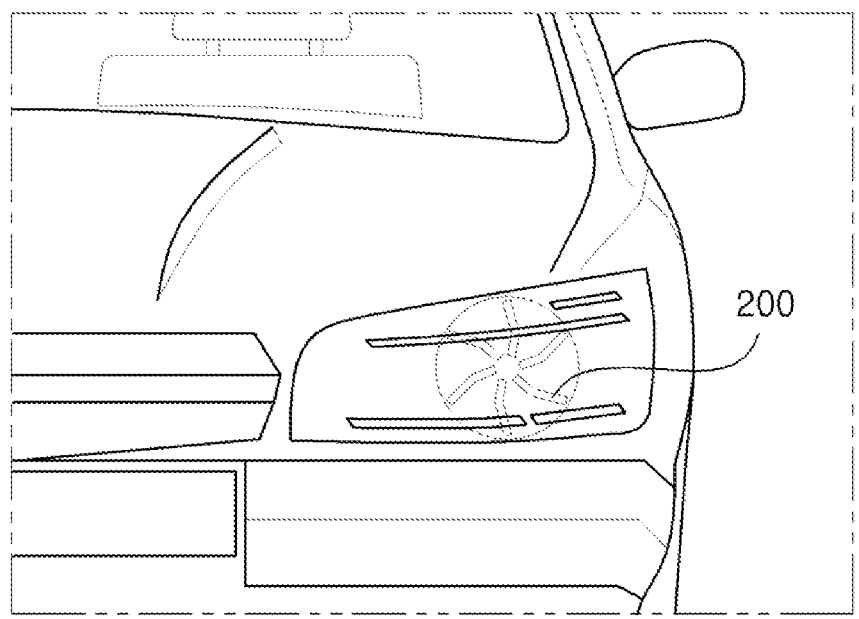
FIGS. 28 to 31 are views illustrating a sequence of operations of the head lamp for a vehicle according to the third exemplary embodiment of the present invention.

As illustrated in FIG. 28, in an initial state, the first lamp module 100 and the second lamp module 200 may be turned off, but the present invention is not limited thereto, and in several other exemplary embodiments, only the second lamp module 200 may be turned on. In addition, in several other exemplary embodiments, a state in which both the first lamp module 100 and the second lamp module 200 are turned on is maintained, but there may be a configuration in which a portion of the light generated from the first lamp module 100 is blocked from being transmitted to the front side while the first lamp module 100 is overlapped by the second lamp module 200.

Figure 29:
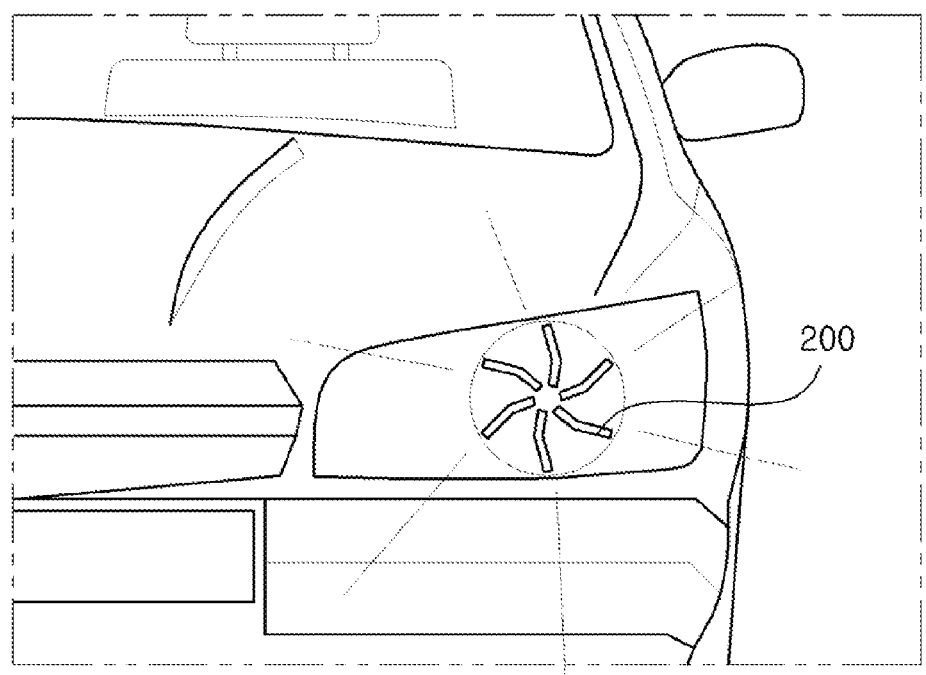

Next, as illustrated in FIG. 29, in a state in which the first lamp module 100 and the second lamp module 200 are turned off, the second lamp module 200, which resembles a shape of an aperture of a camera, is turned on. A position relationship between the first lamp module 100 and the second lamp module 200 may be maintained to correspond to the first mode. That is, in the first mode, a state in which the first lamp module 100 is turned off and the second lamp module 200 is turned on may be maintained.

Figure 30:
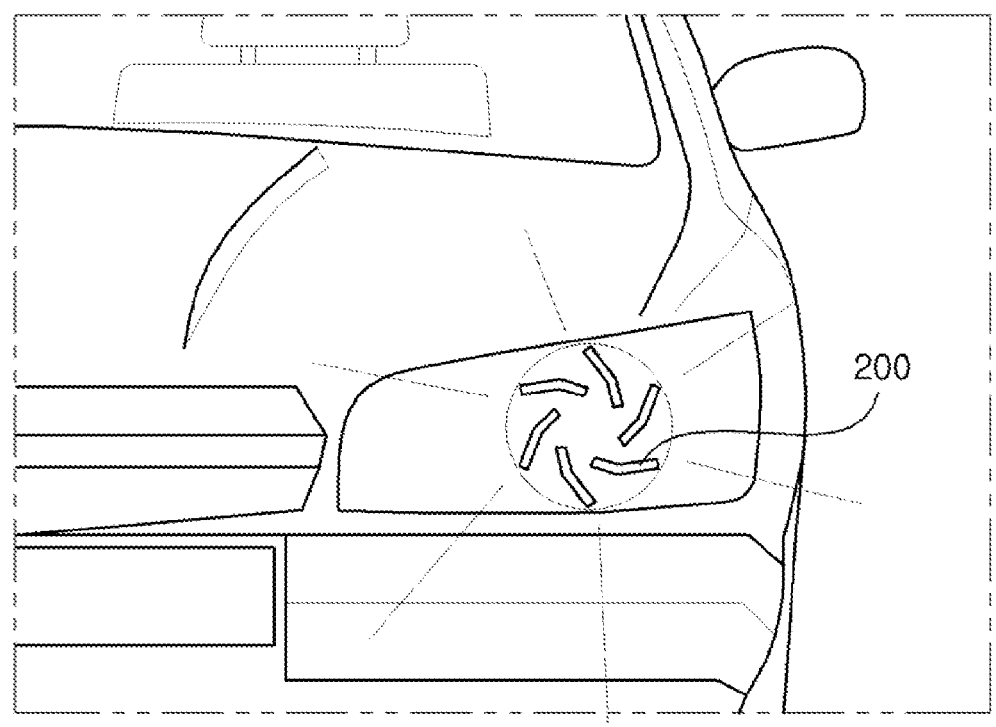

Next, FIG. 30 illustrates a state in which the plurality of light sources of the second lamp module 200 is moved in a direction in which the plurality of light sources is spaced apart from the central portion of the first lamp module 100 such that the second lamp module 200 is moved to a position where a portion of the second lamp module 200 is not overlapped with the first lamp module 100, and thereby, a portion of the first lamp module 100 is exposed to the outside. The above state may refer to an intermediate state when the mode is changed from the first mode into the second mode.

As described above, in the second lamp module 200, when the mode is changed from the first mode into the second mode, the portion where the second lamp module 200 is overlapped with the first lamp module 100 may be gradually decreased. That is, the portion of the first lamp module 100, which is shielded by the second lamp module 200, may be gradually decreased.

In addition, in several other exemplary embodiments, when the mode is changed from the first mode into the second mode, the second lamp module 200 may be configured to be spaced apart from the central portion of the first lamp module 100. For example, in a case in which one end portion of the second lamp module 200 is aligned on the basis of the central portion of the first lamp module 100, and the other end portion of the second lamp module 200 is configured as a predetermined rotating shaft, the second lamp module 200 is rotated on the basis of the other end portion that is the rotating shaft, such that one end portion of the second lamp module 200 may be moved in a direction in which the one end portion of the second lamp module 200 is spaced apart from the central portion of the first lamp module 100.

Figure 31:
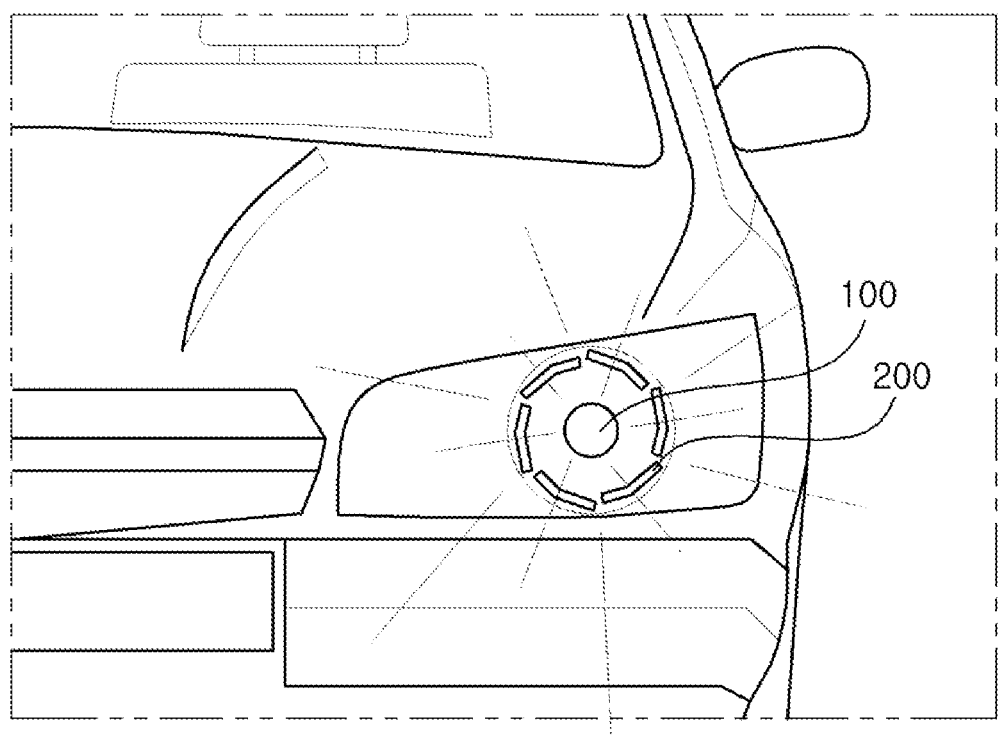

Next, as illustrated in FIG. 31, the mode of the second lamp module 200 according to the third exemplary embodiment of the present invention is completely changed from the first mode into the second mode, and the first lamp module 100 is turned on, thereby completing a structure which implements an image of how an aperture of a camera is fully opened and a lens inside the aperture is exposed.

That is, in the second mode, both the first lamp module 100 and the second lamp module 200 may be turned on.

As such, the first lamp module 100 may be turned on after the mode of the second lamp module 200 is changed from the first mode into the second mode, but the present invention is not limited thereto, and in contrast, the mode of the second lamp module 200 may be changed from the first mode into the second mode after the first lamp module 100 is turned on, and the operation of turning on the first lamp module 100 and the operation of changing the mode of the second lamp module 200 into the second mode may be performed at the same time.

As such, according to the head lamp for a vehicle according to the exemplary embodiments of the present invention, various images or shapes may be expressed when the head lamp is turned on or off, and the head lamp is configured by a plurality of lamps, and the respective lamps are moved by moving means so as to be in a state in which the lamps are overlapped with each other or in a state in which the lamps are not overlapped with each other, thereby expressing a dynamic esthetic appearance.

Particularly, the head lamp for a vehicle is configured to be similar to a shape of how a closed eye is opened when the head lamp is turned on, and in contrast, the head lamp is configured to be similar to a shape of how an eye is closed when the head lamp is turned off, or the head lamp for a vehicle is configured to express an image of how an aperture of a camera is opened in the form of a spiral when the head lamp is turned on, and in contrast, the head lamp is configured to express an image of how an aperture of a camera is blocked when the head lamp is turned off, thereby providing a sense of closeness and a sense of unity to the vehicle, and expressing a special design esthetic appearance.

Figure 32:
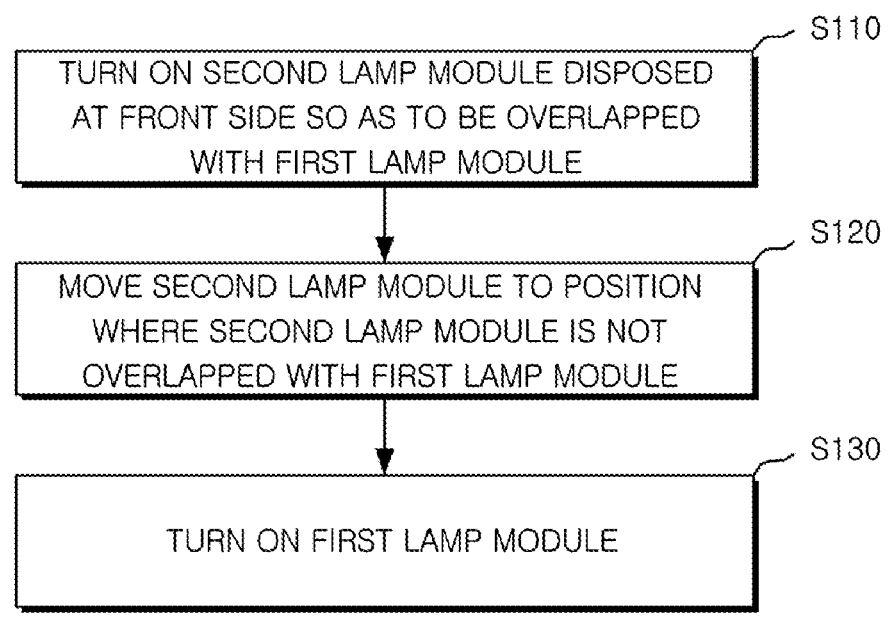
FIGS. 32 and 33 are flow charts illustrating a method of controlling the head lamp for a vehicle according to the exemplary embodiments of the present invention.
Figure 33:
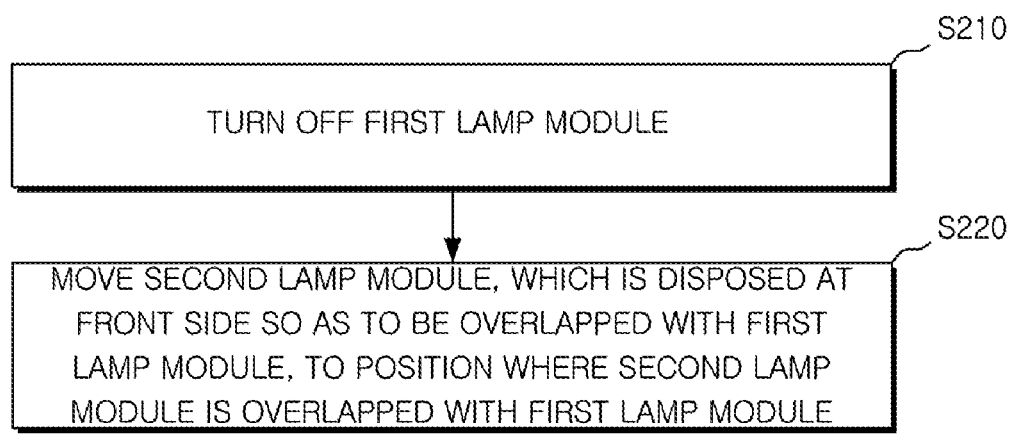

Hereinafter, a method of controlling the head lamp for a vehicle according to the exemplary embodiments of the present invention will be described with reference to FIGS. 32 and 33. FIGS. 32 and 33 are flow charts illustrating a method of controlling the head lamp for a vehicle according to the exemplary embodiments of the present invention.

Referring to FIG. 32, a method of controlling the head lamp for a vehicle according to the exemplary embodiment of the present invention includes turning on the second lamp module disposed at the front side so as to be overlapped with the first lamp module on the light proceeding path (S110), moving the second lamp module to a position where the second lamp module is not overlapped with the first lamp module (S120), and turning on the first lamp module (S130), and the second lamp module includes a plurality of lamps.

First, the second lamp module, which is disposed at the front side so as to be overlapped with the first lamp module on the light proceeding path, is turned on (S110). The first lamp module and the second lamp module are disposed at an initial position where a portion of or the entirety of the second lamp module is overlapped with the first lamp module, and the second lamp module, which configures a daytime running lamp or a positioning lamp, may be turned on first.

The first lamp module may have a larger light quantity than that of the second lamp module, and the first lamp module may have a wider light emitting area than that of the second lamp module.

Next, the second lamp module is moved to a position where the second lamp module is not overlapped with the first lamp module (S120). Here, the method of controlling the head lamp may include moving the second lamp module in a direction in which an interval between the plurality of lamps becomes wider. In addition, when the second lamp module is moved to a position where the second lamp module is not overlapped with the first lamp module, the portion where the second lamp module and the first lamp module are overlapped with each other may be gradually decreased.

Next, the first lamp module is turned on such that a predetermined dynamic image, for example, an opened-eye-shaped image, an opened-aperture-shaped image, or the like may be expressed (S130).

Hereinafter, referring to FIG. 33, a method of controlling a head lamp for a vehicle according to another exemplary embodiment of the present invention may include turning off the first lamp module (S210), and moving the second lamp module, which is disposed at the front side so as to be overlapped with the first lamp module on the light proceeding path, to a position where the second lamp module is overlapped with the first lamp module (S220), and the second lamp module includes a plurality of lamps.

In contrast with the previous exemplary embodiment, the first lamp module is turned off in a state in which the first lamp module is turned on (S210). Here, the second lamp module may be positioned in a region where the second lamp module is not overlapped with the first lamp module so that the first lamp module may be exposed to the outside. As described above, the first lamp module may have a larger light quantity than that of the second lamp module, and the first lamp module may have a wider light emitting area than that of the second lamp module.

Next, the second lamp module, which is disposed at the front side of the first lamp module on the light proceeding path, is moved to a region in which a portion of or the entirety of the second lamp module is overlapped with the first lamp module (S220). Here, the method of controlling the head lamp may include moving the second lamp module in a direction in which an interval between the plurality of lamps becomes narrower. In addition, when the second lamp module is moved to a position where the second lamp module is overlapped with the first lamp module, the portion where the second lamp module and the first lamp module are overlapped with each other may be gradually increased. Thereby, a predetermined dynamic image, for example, a closed-eye-shaped image, a closed-aperture-shaped image, or the like may be expressed.

According to the head lamp for a vehicle according to the aforementioned exemplary embodiments, various images or shapes may be expressed when the head lamp is turned on or off, and further, the head lamp is configured by a plurality of lamps, and the respective lamps are moved by moving means so as to be in a state in which the lamps are overlapped with each other or in a state in which the lamps are not overlapped with each other, thereby expressing a dynamic esthetic appearance.

Particularly, the head lamp for a vehicle is configured to be similar to a shape of how a closed eye is opened when the head lamp is turned on, or the head lamp for a vehicle is configured to express an image of how an aperture of a camera is opened or blocked in the form of a spiral, thereby providing a sense of closeness and a sense of unity to the vehicle, and expressing a special design esthetic appearance.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A head lamp for a vehicle comprising:
a first lamp module; and a second lamp module disposed at a front side of the first lamp module,
wherein a mode of the second lamp module is set to one of a first mode in which a portion of the second lamp module is overlapped with the first lamp module on a light proceeding path, and a second mode in which the second lamp module is not overlapped with the first lamp module,
wherein the first lamp module is turned on after the mode of the second lamp module is changed from the first mode to the second mode and the second lamp module does not block light from the first lamp module when the first lamp module is turned on;
wherein the second lamp module includes a plurality of lamps to enclose the first lamp module, and wherein the first lamp module is observed in front through the separation between lamps of the plurality of lamps of the second lamp module when the second lamp module overlaps with the first lamp module.

2. The head lamp of claim 1, wherein in the first mode, the first lamp module is turned off, and the second lamp module is turned on.

3. The head lamp of claim 1, wherein in the second mode, the first lamp module and the second lamp module are turned on.

4. The head lamp of claim 1, wherein when the mode of the second lamp module is changed from the first mode into the second mode, the portion where the second lamp module and the first lamp module are overlapped with each other is gradually decreased.

5. The head lamp of claim 1, wherein when the mode of the second lamp module is changed from the first mode into the second mode, the second lamp module is spaced apart from a central portion of the first lamp module.

6. The head lamp of claim 1, wherein the mode of the second lamp module is changed from the first mode to the second mode after the first lamp module is turned on.

7. The head lamp of claim 1, wherein when the mode is changed from the first mode into the second mode, the second lamp module is moved in a direction in which an interval of the plurality of lamps becomes wider.

8. The head lamp of claim 1, wherein the plurality of lamps includes a pair of bar type light sources.

9. The head lamp of claim 1, wherein the plurality of lamps are rotated about a rotating shaft by a predetermined angle.

10. The head lamp of claim 9, wherein the plurality of lamps are rotated in the same direction.

11. The head lamp of claim 1, wherein the plurality of lamps includes a plurality of divided light sources.

12. The head lamp of claim 1, wherein the plurality of lamps have a curved portion that is bent at a predetermined angle.

13. The head lamp of claim 12, wherein the predetermined angle of the curved portion is increased as the number of the plurality of lamps are increased.

14. The head lamp of claim 1, wherein in the first mode, the second lamp module is a daytime running lamp (DRL).

15. The head lamp of claim 1, wherein in the second mode, the second lamp module is a positioning lamp.

16. A head lamp for a vehicle comprising:
a first lamp module; and
a second lamp module is configured of a plurality of lamps disposed at a front side of the first lamp module,
wherein a mode of a plurality of second lamp modules are set to one of a first mode in which a portion of the plurality of second lamp modules are overlapped with the first lamp module on a light proceeding path, and a second mode in which the plurality of second lamp modules are not overlapped with the first lamp module, wherein when the mode is changed from the first mode into the second mode, the plurality of second lamp modules are moved in a direction in which an interval of the plurality of lamps becomes wider.

17. The head lamp of claim 16, wherein the plurality of lamps includes a pair of bar type light sources.

18. The head lamp of claim 16, wherein the plurality of lamps are rotated about a rotating shaft by a predetermined angle.

19. The head lamp of claim 18, wherein the plurality of lamps are rotated in the same direction.

20. The head lamp of claim 16, wherein the plurality of lamps includes a plurality of divided light sources.

21. The head lamp of claim 16, wherein the plurality of lamps have a curved portion that is bent at a predetermined angle.

22. The head lamp of claim 21, wherein the predetermined angle of the curved portion is increased as the number of the plurality of lamps are increased.

\* \* \* \* \*